(12) United States Patent
Kim et al.

(10) Patent No.: US 9,929,787 B2
(45) Date of Patent: Mar. 27, 2018

(54) APPARATUS AND METHOD FOR CHANNEL STATE INFORMATION FEEDBACK IN WIRELESS COMMUNICATION SYSTEM

(71) Applicant: Samsung Electronics Co., Ltd., Gyeonggi-do (KR)

(72) Inventors: Dae-Hyun Kim, Seoul (KR); Jong-Ho Oh, Gyeonggi-do (KR); Byoung-Hoon Jung, Seoul (KR)

(73) Assignee: Samsung Electronics Co., Ltd (KR)

( * ) Notice: Subject to any disclaimer, the term of this patent is extended or adjusted under 35 U.S.C. 154(b) by 24 days.

(21) Appl. No.: 14/853,387

(22) Filed: Sep. 14, 2015

(65) Prior Publication Data

US 2016/0081075 A1   Mar. 17, 2016

Related U.S. Application Data

(60) Provisional application No. 62/049,726, filed on Sep. 12, 2014, provisional application No. 62/088,084, filed on Dec. 5, 2014.

(30) Foreign Application Priority Data

Sep. 14, 2015   (KR) ........................ 10-2015-0129437

(51) Int. Cl.
   *H04B 7/06*   (2006.01)
   *H04W 28/06*   (2009.01)
(52) U.S. Cl.
   CPC ......... *H04B 7/0619* (2013.01); *H04B 7/0617* (2013.01); *H04W 28/06* (2013.01)

(58) Field of Classification Search
   None
   See application file for complete search history.

(56) References Cited

U.S. PATENT DOCUMENTS

| 2005/0170781 | A1 | 8/2005 | Jacobsen et al. | |
| 2011/0075607 | A1* | 3/2011 | Kim | H04B 7/0417 370/328 |
| 2011/0222473 | A1* | 9/2011 | Breit | H04L 1/0026 370/328 |
| 2012/0177018 | A1* | 7/2012 | Abraham | H04L 1/0027 370/338 |
| 2013/0010632 | A1 | 1/2013 | Wang et al. | |

(Continued)

OTHER PUBLICATIONS

International Search Report dated Jan. 29, 2016 issued in counterpart application No. PCT/KR2015/009625, 10 pages.

(Continued)

*Primary Examiner* — Brian Roberts
(74) *Attorney, Agent, or Firm* — The Farrell Law Firm, P.C.

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). Methods and apparatuses are provided for devices in a wireless communication system. Information requesting a channel estimation by at least one second device is transmitted from a first device to the at least one second device. Channel information is received at the first device as feedback from the at least one second device.

30 Claims, 34 Drawing Sheets

(56) References Cited

U.S. PATENT DOCUMENTS

| 2013/0094488 A1 | 4/2013 | Choi et al. |
| 2013/0223427 A1* | 8/2013 | Sohn ............... H04W 74/06 370/338 |
| 2013/0235836 A1 | 9/2013 | Roh et al. |
| 2013/0272347 A1 | 10/2013 | Merlin et al. |

OTHER PUBLICATIONS

IEEE P802.11acTM/D5.0_Draft Standard for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz, Prepared by the 802.11 Working Group of the 802 Committee, Copyright 2013 by the IEEE, pp. 440.

* cited by examiner

EXAMPLE OF USING DISCONTINUOUS CHANNEL OF 0~10,
AND 20~30MHz

| 1 | 1 | 0 | 0 | 1 | 1 | 0 | 0 | 0 | 0 | 0 | 0 | 0 | 0 | 0 | 0 |

0MHz          40MHz          80MHz

| Order | Information |
|---|---|
| 1 | Category |
| 2 | HE Action |
| 3 | HE MIMO Control |
| 4 | HE Compress Beamforming Report |
| 5 | MU Exclusive Beamforming Report |

FIG.18A

| Nc Index | Nr Index | Channel Width | Grouping | Codebook Information | Feedback Type | Remaining Feedback Segments | First Feedback Segments | Reserved | Sounding Dialog Token |
|---|---|---|---|---|---|---|---|---|---|
| 3 | 3 | 3 | 2 | 1 | 1 | 3 | 1 | 1 | 6 |

Octets

APPARATUS AND METHOD FOR CHANNEL STATE INFORMATION FEEDBACK IN WIRELESS COMMUNICATION SYSTEM

PRIORITY

This application claims priority under 35 U.S.C. § 119(e) to U.S. Provisional Patent Application Ser. Nos. 62/049,726 and 62/088,084, which were filed in U.S. Patent and Trademark Office on Sep. 12, 2014 and Dec. 5, 2014, and under 35 U.S.C. § 119(a) to Korean Application Ser. No. 10-2015-0129437, which was filed in the Korean Intellectual Property Office on Sep. 14, 2015, respectively, the contents of which are incorporated herein by reference.

BACKGROUND

1. Field of the Disclosure

The present disclosure relates generally to a wireless communication system, and more particularly, to an apparatus and a method for feeding back channel information in a wireless communication system.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Institute of Electrical and Electronics Engineers (IEEE) 802.11ax standard, which is the next generation wireless local are network (LAN) standard, aims to improve the performance experienced by a user in an environment that is dense with LAN access points (APs) and users (or stations (STAs)). In such a dense area, dozens of stations may be allocated to a single AP, and communication limitations are attributed since only the multiple user-multiple input multiple output (MU-MIMO) scheme that is supported by the existing wireless LAN standard IEEE 802.11ac is used.

Through the MU-MIMO scheme of the IEEE 802.11ac standard, it is possible to simultaneously transmit signals to up to four stations. In order to transmit signals to four STAs at the same time, a transmitting station requires the channel information on the four stations, and the channel information is required to be fed back from each station. The IEEE 802.11ac standard supports a technique in which up to four STAs feed back their own channel information. In the IEEE 802.11ac standard, the STAs that can simultaneously transmit signals are limited to four STAs, and in order to increase the number of simultaneously-transmittable STAs, the number of antennas must be increased. The number of antennas that can be installed in a transmitter is limited by the physical space. In addition, although the number of antennas increases, the time required for the feedback increases as the number of STAs increases, when using the 802.11ac-based method. This lowers the transmission efficiency in the concentrated area causing congestion.

Although the IEEE 802.11ac standard does not support the orthogonal frequency division multiple access (OFDMA) technique, it is expected that the IEEE 802.11ax will adopt the OFDMA technique. The OFDMA technique allocates subcarriers to different users, thereby enabling a multi-connection so that various effects, such as, for example, an increase in system capacity, can be obtained. By supporting the OFDMA technique, additional resources can be minimized and the number of concurrent users can be increased, thereby improving the performance a user experiences in a dense environment.

SUMMARY

The present disclosure has been made to address at least the above problems and/or disadvantages and to provide at least the advantages described below. Accordingly, an aspect of the present disclosure provides an apparatus and a method for transmitting and receiving channel state information in a wireless communication system.

Various embodiments of the present disclosure provide an apparatus and a method in which the first device adjusts resources for the channel information feedback of the second device in a wireless communication system in order to efficiently use the resources.

Various embodiments of the present disclosure provide an apparatus and a method for feeding a channel state of each user back to a management device in the wireless communication system that supports the MU-MIMO technique and the OFDMA technique.

Various embodiments of the present disclosure provide an apparatus and a method, which can reduce a service delay with respect to each user when feeding back the channel state of each user to an AP in the wireless communication system that supports the MU-MIMO technique and the OFDMA technique.

Various embodiments of the present disclosure provide an apparatus and a method, which can improve the wireless resource efficiency of each user when feeding back the channel state of each user to an AP in the wireless communication system that supports the MU-MIMO technique and the OFDMA technique.

According to an embodiment of the present disclosure, an operating method is provided for a first device in a wireless communication system. Information requesting a channel estimation by at least one second device is transmitted from the first device to the at least one second device. Channel information is received as feed back at the first device, from the at least one second device.

According to another embodiment of the present disclosure, an operating method is provided for a second device in a wireless communication system. Information requesting a channel estimation is received at the second device from a first device. The second device transmits channel information, which is generated based on the information, to the first device.

According to another embodiment of the present disclosure, a first device is provided in a wireless communication system. The first device includes a transmitter configured to transmit information requesting a channel estimation by at least one second device, to the at least one second device. The first device also includes a receiver configured to receive channel information as feed back from the at least one second device.

According to another embodiment of the present disclosure, a second device is provided in a wireless communication system. The second device includes a receiver configured to receive information requesting a channel estimation from a first device. The second device also includes a transmitter configured to transmit channel information, which is generated based on the information, to the first device.

According to another embodiment of the present disclosure, a non-transitory computer readable medium is provided with computer executable instructions stored thereon executed by a processor to perform the method of operating a first device in a wireless communication system. The method includes transmitting, to at least one second device, information requesting a channel estimation by the at least one second device; and receiving channel information as feed back from the at least one second device.

According to another embodiment of the present disclosure, a non-transitory computer readable medium is provided with computer executable instructions stored thereon executed by a processor to perform the method of operating a second device in a wireless communication system. The method includes receiving, from a first device, information requesting a channel estimation; and transmitting channel information, which is generated based on the information, to the first device.

BRIEF DESCRIPTION OF THE DRAWINGS

The above and other aspects, features, and advantages of the present disclosure will be more apparent from the following detailed description when taken in conjunction with the accompanying drawings, in which:

FIG. 11A to FIG. 11C are diagrams illustrating feedback transmission channel information that is created by the first device of a wireless communication system, according to an embodiment of the present disclosure;

FIG. 18A and FIG. 18B are diagrams illustrating a MAC frame that is created by the second device of a wireless communication system, according to another embodiment of the present disclosure;

DETAILED DESCRIPTION

Figure 1:
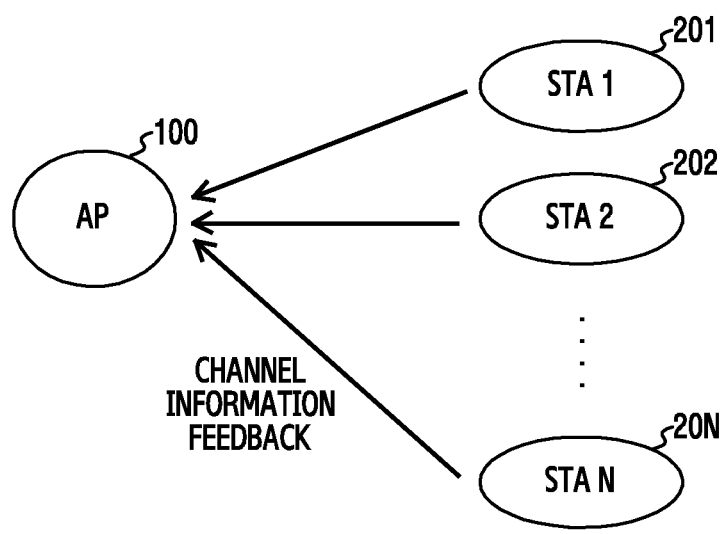
FIG. 1 is a diagram illustrating a wireless communication system, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

Terms described herein are defined in consideration of the functions of the present disclosure, but the meanings of the terms may be changed according to a user, intention of an operator, or convention. Accordingly, the terms should be defined based on the contents as a whole.

The present disclosure may have various modifications and various embodiments, among which specific embodiments are described more fully with reference to the accompanying drawings. However, it should be understood that the present disclosure is not limited to the specific embodiments, but includes all modifications, equivalents, and alternatives within the spirit and the scope of the present disclosure. Thus, FIG. 1 to FIG. 25 illustrate examples to explain the concept of the present disclosure, and should not be interpreted to limit the scope of the present disclosure.

The various embodiments of the present disclosure described below relate to the transmission/reception of information, in a wireless communication system, between a first device that manages the system and a second device that is managed by the first device. In particular, embodiments of the present disclosure relate to an apparatus and a method in which the second device feeds back channel state information to the first device. Embodiments of the present disclosure may be applied to a wireless local area network (WLAN) environment that adopts the MU-MIMO scheme in which a plurality of users and a plurality of antennas are used together, and the OFDMA scheme in which multiple channels are simultaneously used. Accordingly, the first device may be embodied as an AP, and the second device may be embodied as a STA or a terminal. Hereinafter, a description will be made in which embodiments of the present disclosure are applied to the WLAN system that includes the AP and one or more STAs, but the scope of the present disclosure is not limited thereto, and embodiments of the present disclosure may be applied to any wireless communication environment that is properly arranged. For example, embodiments of the present disclosure may be applied to a wireless communication system that includes a single AP 100 and a plurality of STAs 201 to 20N, as shown in FIG. 1. In this case, the STAs 201 to 20N feed back channel state information to the AP 100.

In the WLAN system, since a plurality of STAs are different from each other in number of antennas, the allocated channel, the channel to be fed back, the channel state, or the like, the amount of channel information to be fed back may be different. Accordingly, even if a plurality of STAs starts the feedback at the same time, the end time thereof may be different. Since the time difference of the feedback may not be short, a waste of resources may result in a channel in which the channel information feedback is completed early. For example, referring to FIG. 2A, STA 1 to STA 3 differ in the feedback times. Since the feedback of the STA 2 ends relatively earlier, a waste of resources may occur in channel #2 with respect to the STA2 (see 210A).

In addition, differences in feedback end times of the STAs may result in channel occupation by other STAs. For example, referring to FIG. 2B, differences between in amounts of information in STA 1 to STA 4 may cause differences in uplink (UL) end times when feeding back the channel information. If the difference in the UL end time is equal to or more than a predetermined distributed interframe space (DIFS) value (e.g., 34 us), another STA may occupy the channel first. Accordingly, an AP cannot transmit downlink (DL) data, and the effective time of the channel information expires when occupying the channel next (see 210B). That is, the channel information that has been fed back becomes useless.

Embodiments of the present disclosure provide methods in an effort to solve the above-described problems that may occur when feeding back channel information. An embodiment of the present disclosure provides a method for feeding back channel information such that a waste of resources due to a mismatch of the OFDMA channel feedback end time may be prevented. This embodiment is described with reference to FIG. 8A to FIG. 13 below. Another embodiment of the present disclosure provides a method for preventing the resource from being occupied by another STA in the case of a mismatch of the OFDMA channel feedback end time. This embodiment is described with reference to FIG. 15 to FIG. 25 below. Although methods are described through separate drawings and embodiments, it should be noted that the drawings and the embodiments can be applied to both of the methods. Therefore, embodiments of the present disclosure consider the MAC frame structure and the frame transmission method, which are described in detail below, in order to feed back the channel information through the OFDMA scheme in the wireless LAN.

Figure 4:
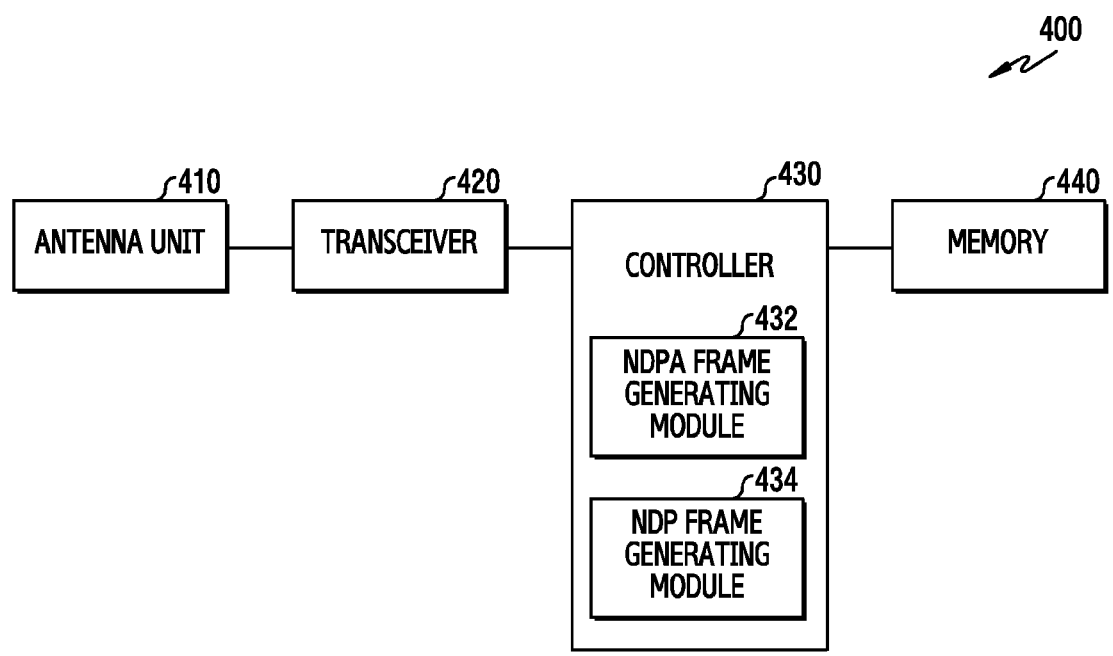
FIG. 4 is a block diagram illustrating first device of a wireless communication system, according to an embodiment of the present disclosure.

FIG. 4 is a block diagram of a first device in a wireless communication system, according to an embodiment of the present disclosure. For example, a first device 400 may be the AP 100 in the WLAN environment of FIG. 1, which supports the MU-MIMO scheme and the OFDMA scheme.

Referring to FIG. 4, the first device 400 includes an antenna unit 410, a transceiver 420, a controller 430, and a memory 440.

The antenna unit 410 transmits a signal, which is processed for transmission by the transceiver 420, through a wireless channel, and receives a signal through the wireless channel. The antenna unit 410 may include a plurality of antennas, an array antenna, or antenna elements in order to support beamforming.

The transceiver 420 processes a signal that is to be transmitted, and processes a signal that is received. For example, the transceiver 420 converts a signal between a baseband signal and a bit stream, according to a physical layer specification of the system. When transmitting the data, the transceiver 420 encodes and modulates a transmission bit stream to generate complex symbols. The transceiver 420 may map the complex symbols with subcarriers, and may generate OFDMA symbol through an inverse fast Fourier transform (IFFT) calculation. When receiving data, the transceiver 420 demodulates and decodes a baseband signal to thereby restore a reception bit stream. In addition, the transceiver 420 up-converts the baseband signal into a radio frequency (RF) band signal to be transmitted through the antenna unit 410, and down-converts the RF band signal received through the antenna unit 410 into the baseband signal. For example, the transceiver 420 may include a transmission filter, a reception filter, an amplifier, a mixer, an oscillator, a digital to analog convertor (DAC), an analog to digital convertor (ADC), or the like.

In addition, the transceiver 420 may include a plurality of RF chains. Furthermore, the transceiver 420 may support beamforming. In order to perform beamforming, the transceiver 420 may adjust the phase and size of each signal that is transmitted and received through a plurality of antennas or antenna elements, which are included in the antenna unit 410. In addition, the transceiver 420 may perform pre-coding with respect to a plurality of data streams that are transmitted. The first device 400 may perform MU-MIMO communication and OFDMA communication. The transceiver 420 transmits and receives signals, as described above. The transceiver 420 may be referred to as a communication unit or a transmitting/receiving unit, and in some cases, may be illustrated as being separate from a transmitter and a receiver, or a transmitting unit and a receiving unit.

The memory 440 stores data, such as, for example, basic programs for operation of the transmitting device, application programs, configuration information, and the like. In addition, the memory 440 provides the stored data according to a request from the controller 430. For example, the memory 440 may store programs and/or instructions related to performing operations according to FIG. 6, operations for generating a MAC frame (or information) according to FIG. 8A to FIG. 11C, or operations according to procedures shown in FIG. 12 to FIG. 14. In another example, the memory 440 may store programs and/or instructions related to performing operations according to FIG. 6, operations for generating the MAC frame (or information) according to FIG. 15 to FIG. 18B, or operations according to FIG. 19 to FIG. 25.

The controller 430 controls the overall operations of the first device 400. For example, the controller 430 transmits and receives signals through the transceiver 420. In addition, the controller 430 writes the data in the memory 440, and reads the data from the memory 440. The controller 430 may include one or more processors, or may perform operations according to embodiments of the present disclosure. For example, the controller 430 may perform operations according to FIG. 6, operations of generating the MAC frame (or information) according to FIG. 8A to FIG. 11C, or operations according to FIG. 12 to FIG. 14. In another example, the controller 430 may perform operations according to FIG. 6, operations of generating the MAC frame (or information) according to FIG. 15 to FIG. 18B, or operations according to FIG. 19 to FIG. 25.

The controller 430 includes a null data packet announcement (NDPA) frame generating module 432, and a null data packet (NDP) frame generating module 434. The MAC frames generated by the controller 430 may have structures shown in FIG. 7A, FIG. 7B, and FIG. 8A to FIG. 11C.

According to embodiments of the present disclosure, the transceiver 420 transmits the channel estimation request information to one or more of the second devices for the channel information feedback, and receives the channel information from the second device.

In an embodiment, the channel estimation request information includes the identification information of the second device, and the resource allocating indication information for the feedback.

In an embodiment, the identification information includes one piece of the information that indicates the group to which the second device belongs, or the information that indicates the sub-band to which the second device belongs.

In an embodiment, the resource allocating indication information includes one piece of the information that indicates the channel information to be fed back, the information that indicates the channel through which the channel information is to be transmitted, or the information that indicates the time when the channel information is transmitted.

In an embodiment, the transmitter duplicates and transmits the channel estimation request information through all of the available channels.

In another embodiment, the transmitter transmits the channel estimation request information through a predetermined primary channel or the channel corresponding to the second device.

Figure 5:
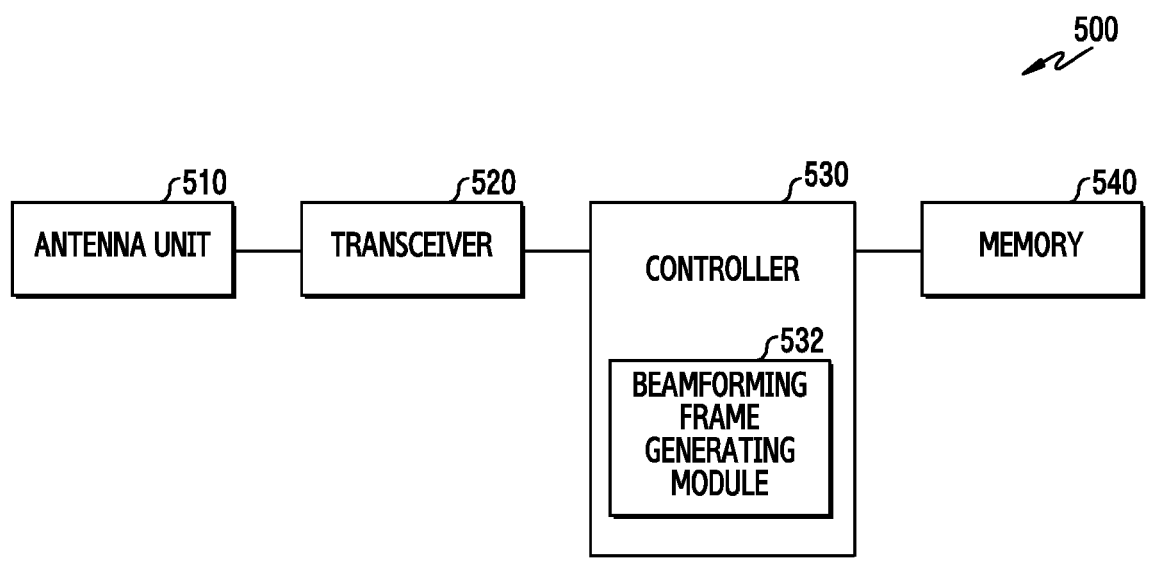
FIG. 5 is a block diagram illustrating a second device of a wireless communication system, according to an embodiment of the present disclosure.

FIG. 5 is a block diagram of a second device of a wireless communication system, according to embodiments of the present disclosure. For example, a second device 500 may be embodied as one or more of the STAs 201-20N in the WLAN environment of FIG. 1, which supports the MU-MIMO scheme and the OFDMA scheme.

Referring to FIG. 5, the second device 500 includes an antenna unit 510, a transceiver 520, a controller 530, and a memory 540, which function in a manner similar to that of the transceiver 420, the controller 430, and the memory 440 of the first device 400 in FIG. 4. Thus, a detailed description thereof is omitted.

The antenna unit 510 transmits a signal, which is processed to be transmitted by the transceiver 520, through a wireless channel, and receives a signal in the wireless channel. The antenna unit 510 may include a plurality of antennas, an array antenna, or antenna elements in order to support the beamforming.

The transceiver 520 transmission-processes a signal that is to be transmitted, and reception-processes a signal that is received. For example, the transceiver 520 performs a function of converting between a base band signal and a bit stream according to the physical layer specification of the system. When transmitting the data, the transceiver 520 encodes and modulates a transmission bit stream to thereby generate complex symbols. At this time, the transceiver 520 may map the complex symbols with subcarriers, and may generate the OFDMA symbol through the inverse fast Fourier transform (IFFT) calculation. When receiving the data, the transceiver 520 demodulates and decodes a base band signal to thereby restore a reception bit stream. In addition, the transceiver 520 up-converts the base band signal into a radio frequency (RF) band signal to be transmitted through the antenna unit 510, and down-converts the RF band signal received through the antenna unit 510 into the base band signal. For example, the transceiver 520 may include a transmission filter, a reception filter, an amplifier, a mixer, an oscillator, a DAC (digital to analog convertor), an ADC (analog to digital convertor), or the like.

In addition, the transceiver 520 may include a plurality of RF chains. Furthermore, the transceiver 520 may support the beamforming. In order to perform the beamforming, the transceiver 520 may adjust the phase and size of each signal that is transmitted and received through a plurality of antennas or antenna elements, which are included in the antenna unit 510. In addition, the transceiver 520 may perform the pre-coding with respect to a plurality of data streams that are transmitted. The second device 500 may perform the MU-MIMO communication and the OFDMA communication. The transceiver 520 transmits and receives signals, as described above. The transceiver 520 may be referred to as a communication unit or a transmitting/ receiving unit, and in some cases, may be illustrated to be separated into a transmitter and a receiver, or a transmitting unit and a receiving unit.

The memory 540 stores the data, such as basic programs for the operation of the transmitting device, application programs, configuration information, or the like. In addition, the memory 540 provides the stored data according to a request from the controller 530. For example, the memory 540 may store programs and/or instructions related to performing the operation according to the flowchart of FIG. 6, the operation of generating the MAC frame (or information) according to the structure shown in FIG. 8A to FIG. 11C, or the operation according to the procedures shown in FIG. 12 to FIG. 14. For another example, the memory 540 may store programs and/or instructions related to performing the operation according to the flowchart of FIG. 6, the operation of generating the MAC frame (or information) according to the structure shown in FIG. 15 to FIG. 18B, or the operation according to the procedures shown in FIG. 19 to FIG. 25.

The controller 530 controls the overall operations of the second device 500. For example, the controller 530 transmits and receives signals through the transceiver 520. In addition, the controller 530 writes the data in the memory 540, and reads the data from the memory 540. The controller 530 may include one or more processors, or may make a control to perform the operation according to the embodiments of the present disclosure. For example, the controller 530 may make a control to perform the operation according to the flowchart of FIG. 6, the operation of generating the MAC frame (or information) according to the structure shown in FIG. 8A to FIG. 11C, or the operation according to the procedures shown in FIG. 12 to FIG. 14. For another example, the controller 530 may make a control to perform the operation according to the flowchart of FIG. 6, the operation of generating the MAC frame (or information) according to the structure shown in FIG. 15 to FIG. 18B, or the operation according to the procedures shown in FIG. 19 to FIG. 25.

The controller 530 includes a beamforming frame generating module 532. The beamforming frames generated by the controller 530 may have structures shown in FIG. 12 to FIG. 14, or FIG. 19 to FIG. 25.

According to embodiments of the present disclosure, the transceiver 520 receives the channel estimation request information from the first device, and transmits the channel information, which is generated based on the channel estimation request information, to the first device.

In an embodiment, the channel estimation request information includes the identification information of the second device, and the resource allocating indication information for the feedback.

In an embodiment, the identification information includes one piece of the information that indicates a group to which the second device belongs, or the information that indicates a sub-band to which the second device belongs.

In an embodiment, the resource allocating indication information includes one piece of the information that indicates the channel information to be fed back, the information that indicates the channel through which the channel information is to be transmitted, or the information that indicates the time when the channel information is transmitted.

In an embodiment, the channel estimation request information is duplicated and transmitted to the second device through all of the available channels. In another embodiment, the channel estimation request information is transmitted to the second device through a predetermined primary channel or the channel corresponding to the second device.

Figure 6:
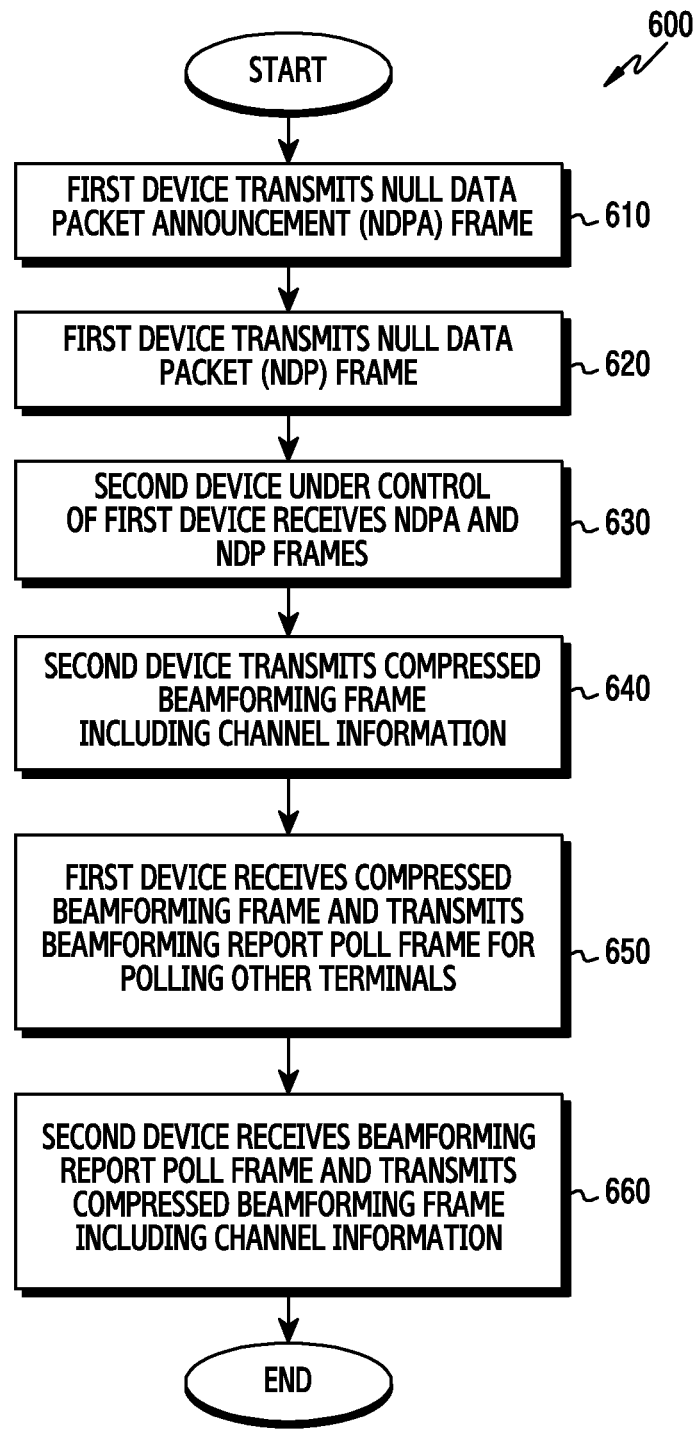
FIG. 6 is a flowchart illustrating an operation that is performed by the first device and the second device of a wireless communication system, according to an embodiment of the present disclosure.

FIG. 6 is a flowchart illustrating an operation 600 that is performed by the first device and the second device of the wireless communication system, according to an embodiment of the present disclosure. For example, the first device 400 may be the AP 100 of the WLAN environment as shown in FIG. 1, which supports the MU-MIMO scheme and the OFDMA scheme, and the second device 500 may be one or more of STAs 201-20N of the WLAN environment as shown in FIG. 1, which supports the MU-MIMO scheme and the OFDMA scheme.

In FIG. 6, an AP, which is the first device, receives channel information feedback from at least one terminal, which is the second device.

In step 610, the first device, which manages the wireless communication system, transmits an NDPA frame that requests channel estimation.

In step 620, the first device transmits an NDP frame.

In step 630, the second device, which is under the control of the first device, receives the NDPA frame and the NDP frame.

In step 640, the second device transmits a compressed beamforming frame that includes the channel information.

In step 650, the first device receives the compressed beamforming frame, and transmits a beamforming report poll frame for polling other terminals.

In step 660, the second device receives the beamforming report poll frame, and transmits a compressed beamforming frame that includes the channel information.

In an embodiment of the present disclosure, the process, in which the first device transmits the NDPA frame, may include one of a first operation, a second operation, a third operation, or a fourth operation.

The first operation includes duplicating the NDPA frame, which includes the first terminal information, for each sub-band, and transmitting the same. The first terminal information includes information, such as, for example, an association ID (AID), a feedback type, feedback length, or information on the streams that are to be transmitted/received at the same time, about all of the terminals that intend to receive the channel information feedback.

The second operation includes separating the NDPA frame, which includes the second terminal information, for each sub-band, and transmitting the same. The second terminal information includes information, such as, for example, the AID, the feedback type, the feedback length, or the information on the streams that are to be transmitted/received at the same time, about the terminals that intend to use each sub-band among the terminals that intend to receive the channel information feedback. For example, a downlink orthogonal frequency division multiple access (DL-OFDMA) scheme may be used for the second transmission operation.

The third operation includes duplicating the NDPA frame, which includes a group ID (GID) to which all of the terminals that intend to receive the channel information feedback belong, for each sub-band, and transmitting the same.

The fourth operation includes separating the NDPA frame, which includes GIDs of the groups to which the terminals that intend to use each sub-band among the terminals that intend to receive the channel information feedback belong, for each sub-band, and transmitting the same. For example, the DL-OFDMA scheme may be used for the fourth transmission operation.

In an embodiment of the present disclosure, the process, in which the second device receives the NDPA and the NDP, and transmits the compressed beamforming frame including the channel information, may include one of a first method or a second method.

According to the first method, if the NDPA is configured based on the AID as a result of referring to the received NDPA, the second device recognizes its own appointing (calling) sequence in the sub-band to which the second device belongs, and the second device transmits the channel information only when the second device is appointed first (or last) in each sub-band.

According to the second method, if the NDPA is configured based on the GID as a result of referring to the received NDPA, the second device recognizes its own position in the group to which the second device belongs, and the second device transmits the channel information only when the second device is allocated with a lowest position (or a highest position) in each sub-band.

In an embodiment of the present disclosure, the process, in which the second device receives the NDPA and the NDP, and transmits the compressed beamforming frame including the channel information, includes an operation in which, as a result of referring to the received NDPA, if there is a remaining frame length in order to transmit the beamforming frame that is compressed to conform to a predetermined length in the NDPA, the remaining frame length is zero-padded to be thereby transmitted.

In an embodiment of present disclosure, the process, in which the first device receives the compressed beamforming frame and transmits the beamforming report poll frame for polling other terminals, may include at least one of a first transmission method and a second transmission method.

According to the first transmission method, the first device duplicates, for each sub-band, the NDPA frame that includes information of the terminals of a next sequence, which exist in each sub-band and intend to receive the channel information feedback. The information of the terminals includes, for example, the AID, the feedback type, the feedback length, the information on the streams that are to be transmitted/received at the same time, or the like, and transmits the same.

According to the second transmission method, the first device separates, for each sub-band, the NDPA frame that includes the information of the terminals of a next sequence, which exist in each sub-band and intend to receive the channel information feedback. The information of the terminals includes, for example, the AID, the feedback type, the feedback length, the information on the streams that are to be transmitted/received at the same time, or the like, and transmits the same. For example, the DL-OFDMA scheme may be used.

Figure 7A:
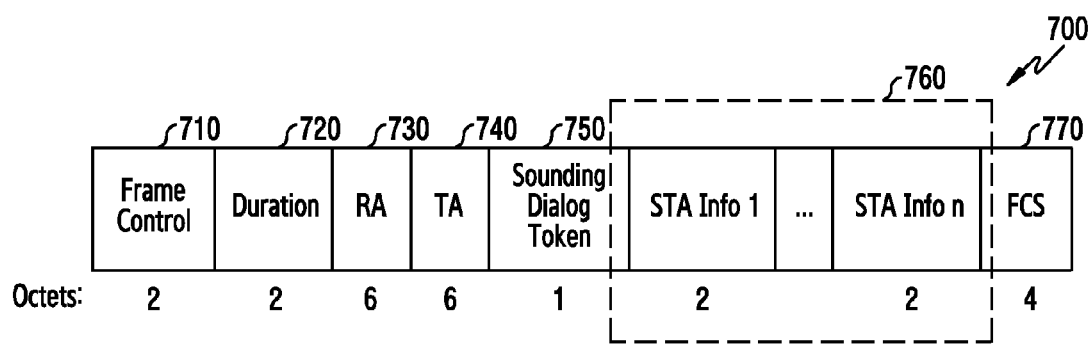
FIG. 7A and FIG. 7B are diagrams illustrating frame structures that are created by the first device of a wireless communication system, according to an embodiment of the present disclosure.
Figure 7B:
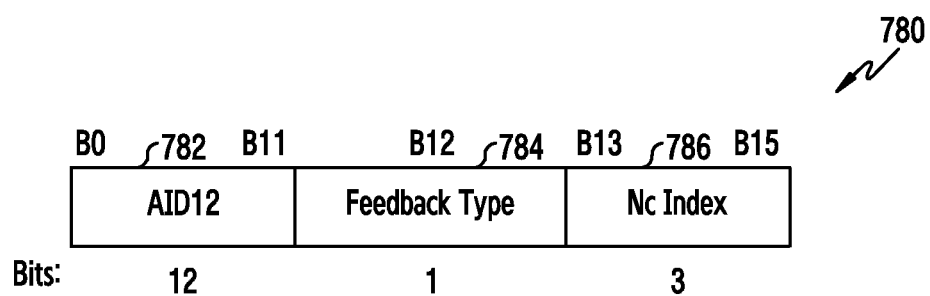

FIG. 7A and FIG. 7B are diagrams illustrating a frame structure that is generated by the first device of a wireless communication system, according to an embodiment of the present disclosure. For example, the first device 400 may be the AP 100 of the WLAN environment as shown in FIG. 1, which supports the MU-MIMO scheme and the OFDMA scheme.

Referring to FIG. 7A, an NDPA frame 700 that is generated in the first device 400 includes a frame control field 710, a duration field 720, a receiver addresses (RA) field 730, a transmitter address (TA) field 740, a sounding dialog token field 750, an STA info field 760, and a frame check sequence (FCS) field 770. The STAinfo field 760 includes a plurality of fields (e.g., n fields) corresponding to each of the STAs.

Referring to FIG. 7B, the STA info field 780 included in the NDPA frame 700 includes an AID12 field 782, a feedback type field 784, and an Nc index field 786. The Nc index field indicates the number of columns of a compressed beamforming matrix.

Hereinafter, according to embodiments of the present disclosure, an embodiment of the channel feedback operation that prevents a waste of resources is described with reference to FIG. 8A to FIG. 14, and an embodiment of the channel feedback operation that prevents the resource from being occupied by another STA is described with reference to FIG. 15 to FIG. 25.

Figure 2A:
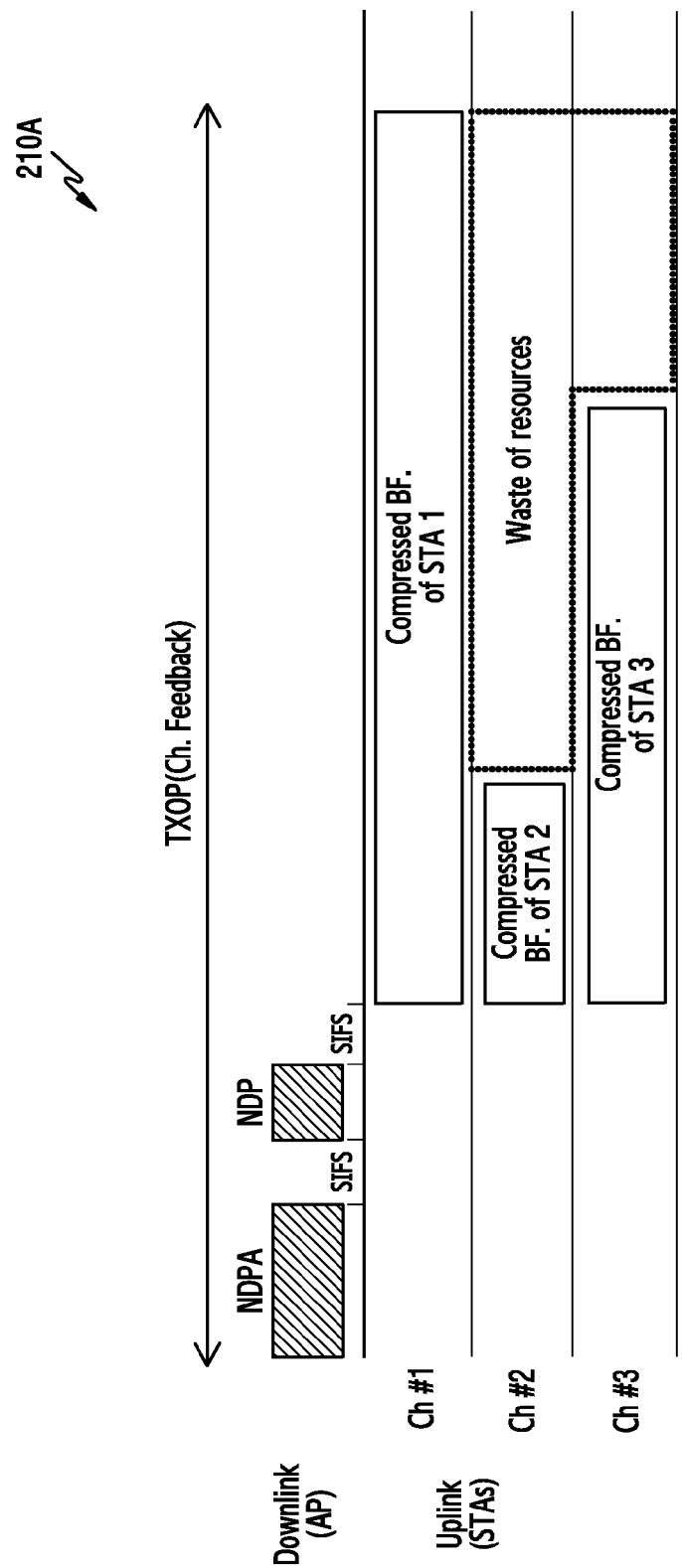
FIG. 2A and FIG. 2B are diagrams illustrating channel information feedback in an existing wireless communication system.
Figure 2B:
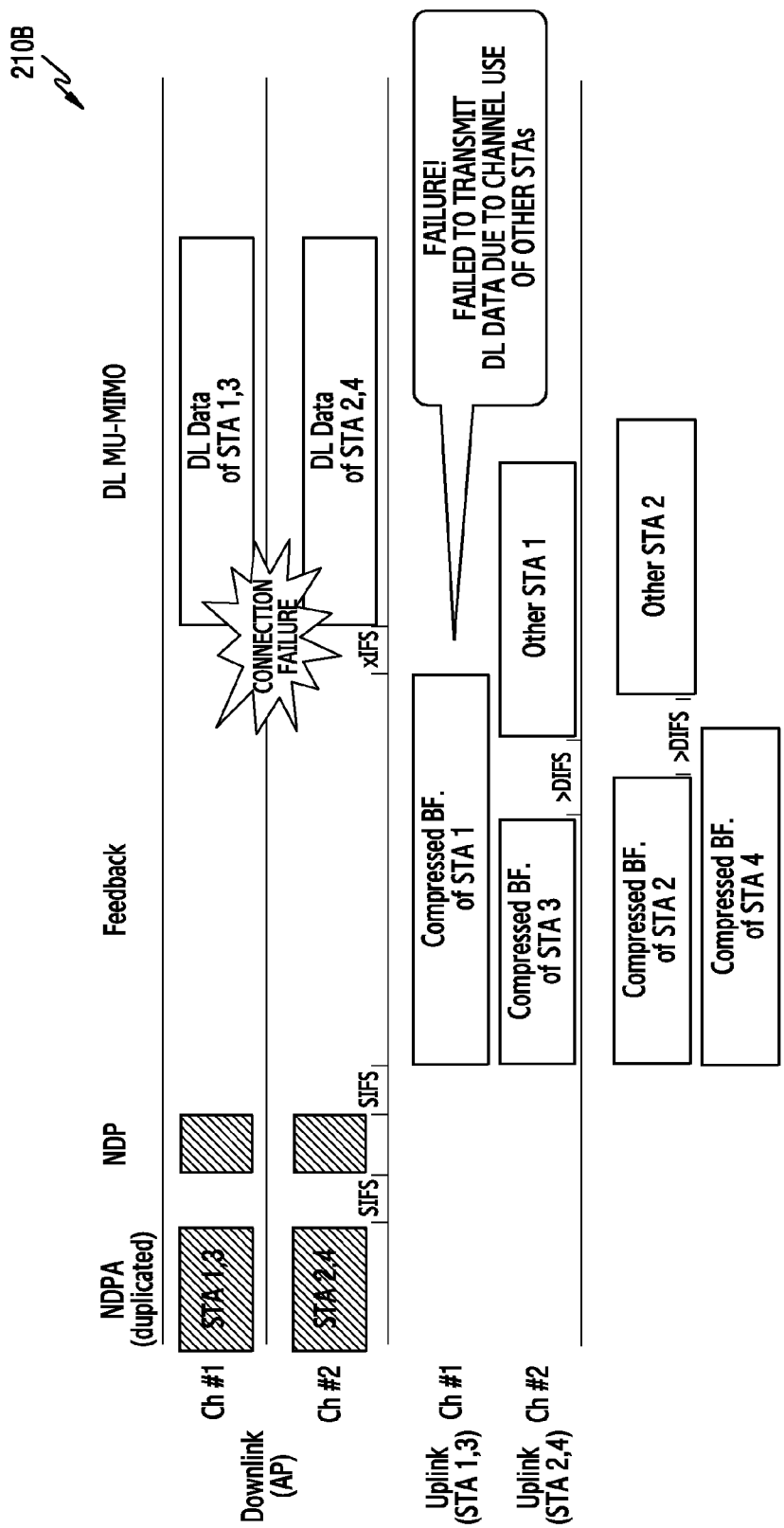

As illustrated in FIG. 2A above, STAs that simultaneously feed back the channel information using the OFDMA scheme may have different channel information feedback times, which may result in a waste of resources. In order to eliminate the time difference, the AP may allocate the frequency and time resources for the feedback in consideration of the amount of information to be fed back by each STA, such that the feedbacks of the STAs end at the same time. In order to make the resource allocation, the AP must recognize the amount of feedback information and the transmission time of each STA. The amount of feedback information and the transmission time of each STA may be obtained through one of the following methods, and either may be applied to embodiments of the present disclosure.

In a first method, the AP may directly collect the amount of feedback information and the transmission time of each STA. The collecting method of the information may include making a request to each STA for the information through polling, allocating a specific time to the information collection and performing the same, or STAs competing with each other in order to directly transfer the information to the AP. The collected information may be all or some of the necessary information.

In a second method, the AP may estimate the amount of feedback information and the transmission time of each STA by using existing information. The existing information may be information of each STA, which is shared in advance, or may be any characteristics of a transmission that has been made previously. Through this information, the AP may calculate the amount of channel information of each STA as the number of OFDM symbols, as shown in Equation (1) below.

$$N_{F,i} N_{a,i} (b\Phi+b\Psi)/(2\ NDBPS, i)\ \text{symbols} \qquad (1)$$

Here, $N_{\Phi,i}$ denotes the number of $\Phi$ elements that the $STA_i$ is to feed back, and $N_{\Psi,i}$ denotes the number of $\Psi$ elements that the $STA_i$ is to feed back. $N_{F,i}$ refers to the number of subcarriers that the $STA_i$ is to feed back, and $N_{DBPS,i}$ refers to the number of data bits that $STA_i$ can transmit with respect to each OFDM symbol. $\Phi$ and $\Psi$ denote the number of bits in which each element is fed back, and may be (5,7) or (7,9) bits.

By using the information collected through one of the above-described methods, the AP may allocate the resource to feed back the channel information to each STA such that the channel feedback times of all STAs match. Such resource allocation information may be transmitted from the AP to the STA by using the STA info field that is included in the NDPA, which can be implemented as shown in FIGS. 8A and 8B, FIGS. 9A and 9B, and FIGS. 10A and 10B.

Figure 8A:
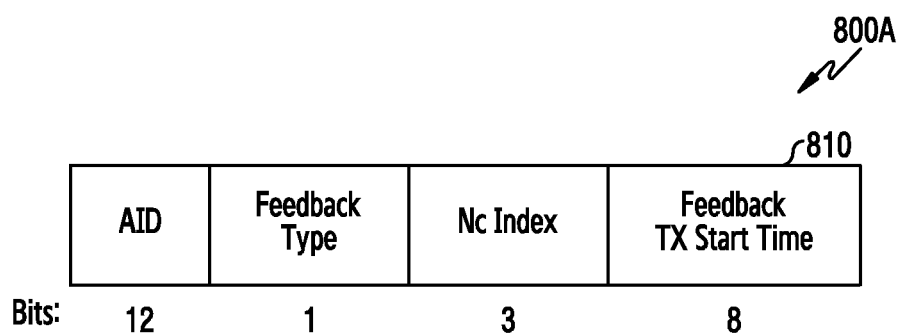
FIG. 8A and FIG. 8B are diagrams illustrating STA information that is created by the first device of a wireless communication system, according to an embodiment of the present disclosure.
Figure 8B:
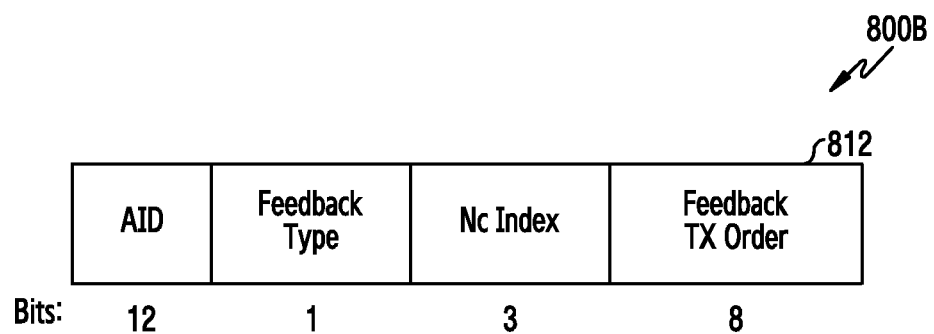

FIG. 8A and FIG. 8B are diagrams illustrating STA information that is generated by the first device of a wireless communication system, according to an embodiment of the present disclosure. For example, the first device 400 may be the AP 100 in the WLAN environment as shown in FIG. 1, which supports the MU-MIMO scheme and the OFDMA scheme, and the STA information may be included in the STAinfo field 760 of FIG. 7A.

Referring to FIG. 8A, STA information 800A includes an AID field, a feedback type field, an Nc index field, and a feedback TX start time field 810. The feedback TX start time field 810 indicates when the STA provides the feedback to the corresponding channel. It is assumed that the STA, which has received the NDPA, recognizes the information to be fed back and the channel through which the information is to be fed back (the case where all of the channel information is determined to be fed back, or the information about the channel, which has received the NDPA, is determined to be fed back), and this corresponds to the embodiment of FIG. 14 in which only the information of the STA, which uses the corresponding channel, is transmitted with respect to each resource, when the NDPA is transmitted in a minimum resource unit. Accordingly, the STA feeds back the channel information about the channel that receives the NDPA through the corresponding channel, and the STA only needs to be informed of the time when the STA provides the feedback to the corresponding channel through the feedback TX start time field 810.

Referring to FIG. 8B, STA information 800B includes a feedback TX order field 812 instead of the feedback TX start time field 810 of FIG. 8A. The feedback TX order field 812 is information that indicates the order in which the STA feeds back the channel information in the corresponding channel.

Figure 9A:
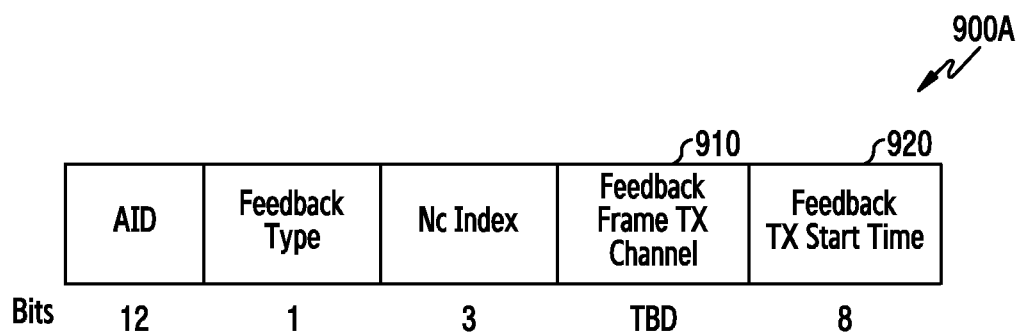
FIG. 9A and FIG. 9B are diagrams illustrating STA information that is created by the first device of a wireless communication system, according to another embodiment of the present disclosure.
Figure 9B:
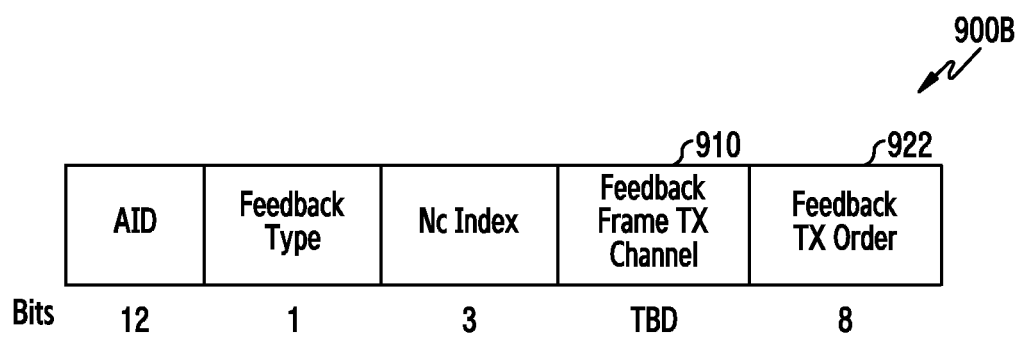

FIG. 9A and FIG. 9B are diagrams illustrating STA information that is generated by the first device of a wireless communication system, according to another embodiment of the present disclosure. For example, the first device 400 may be the AP 100 in the WLAN environment as shown in FIG. 1, which supports the MU-MIMO scheme and the OFDMA scheme, and the STA information may be included in the STA info field 760 of FIG. 7A.

Referring to FIG. 9A, STA information 900A includes an AID field, a feedback type field, an Nc index field, a feedback frame TX channel field 910, and a feedback TX start time field 920. The feedback frame TX channel field 910 includes information that indicates the channel through which the channel information is transmitted. The feedback TX start time field 920 includes information that indicates the time when the STA provides the feedback through the corresponding channel. FIG. 9A corresponds to the case where the STA recognizes that the information about a certain channel is to be fed back, but does not recognize the channel through which the information is to be fed back. Accordingly, the AP provides information on the channel through which the feedback is to be conducted through the feedback frame TX channel field 910 such that the STA feeds back the channel information by using the channel that is allocated by the AP. For example, the AP may express the information on the channel through which the feedback is to be made in the form of a bit map through the feedback frame TX channel field 910.

Referring to FIG. 9B, STA information 900B may include a feedback TX order field 922 instead of the feedback TX start time field 920 of FIG. 9A. The feedback TX order field 922 includes information that indicates the order in which the STA feeds back the channel information in the corresponding channel.

Regarding FIGS. 8A and 8B, and FIGS. 9A and 9B, the information of 1 bit, which indicates whether each STA is to feed back channel information with respect to all of the channels that receive the NDP or feed back only channel information that is allocated to the STA, is added to the feedback type (total 2 bits) to then be transmitted. The existing IEEE 802.11ac provides the feedback type of 1 bit, which shows only whether or not the STA is a single STA or a multi-STA. However, in the case of the OFDMA, the feedback channel information is included by adding one bit.

Figure 10A:
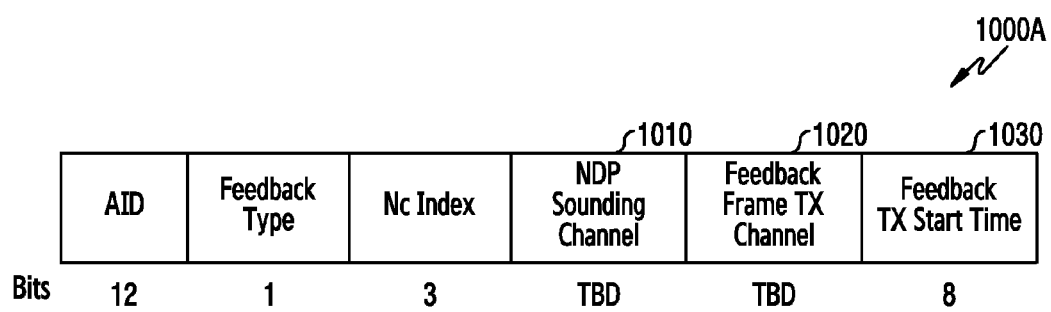
FIG. 10A and FIG. 10B are diagrams illustrating STA information that is created by the first device of a wireless communication system, according to another embodiment of the present disclosure.
Figure 10B:
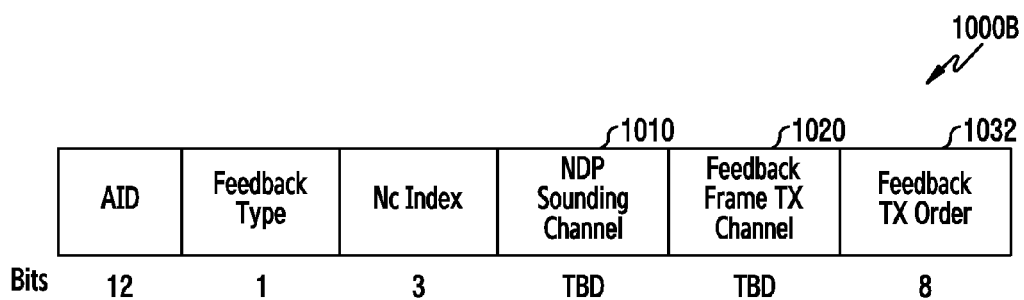

FIG. 10A and FIG. 10B are diagrams illustrating STA information that is generated by the first device of a wireless communication system, according to an embodiment of the present disclosure. For example, the first device 400 may be the AP 100 of the WLAN environment as shown in FIG. 1, which supports the MU-MIMO scheme and the OFDMA scheme, and the STA information may be included in the STA info field 760 as shown in FIG. 7A.

Referring to FIG. 10A, STA information 1000A includes an AID field, a feedback type field, an Nc index field, an NDP sounding channel field 1010, a feedback frame TX channel field 1020, and a feedback TX start time field 1030. The NDP sounding channel field 1010 includes information that indicates the channel information that the STA is to feed back. The feedback frame TX channel field 1020 includes information that indicates the channel through which the channel information is transmitted. The feedback TX start time field 1030 includes information that indicates the time when the STA provides the feedback through the corresponding channel.

Figure 12:
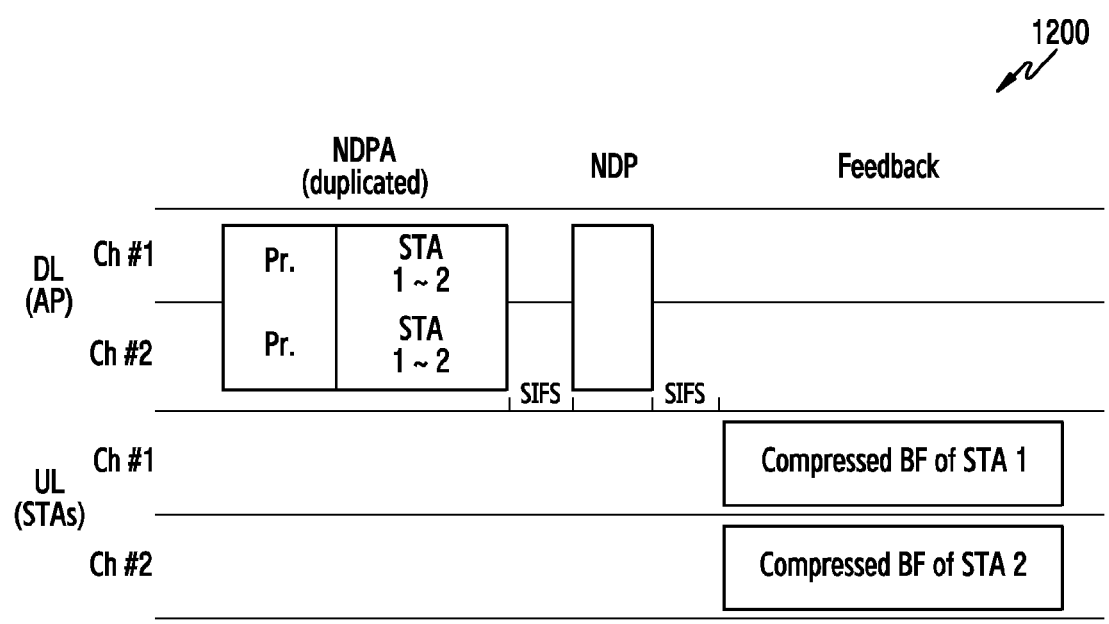
FIG. 12 is a diagram illustrating frame transmission/reception in the first device and the second device of a wireless communication system, according to an embodiment of the present disclosure.
Figure 13:
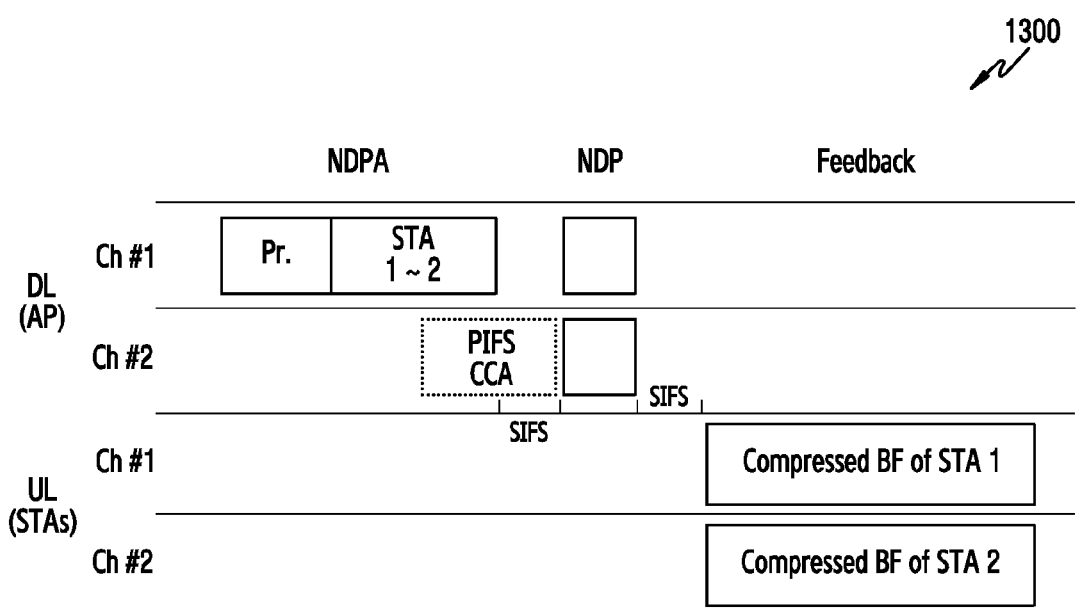
FIG. 13 is a diagram illustrating frame transmission/reception in the first device and the second device of a wireless communication system, according to another embodiment of the present disclosure.

The STA information, as shown in FIG. 10A, may be used when the NDPA does not have information on the use of a specific channel, that is, in an embodiment in which the NDPA contains information about all of STAs that are to feed back the channel information, and the NDPA is duplicated in a minimum resource unit to be thereby transmitted (FIG. 12) or is transmitted through a primary channel (FIG. 13). Accordingly, each STA does not recognize the channel information to be fed back, the channel through which the information is to be fed back, and the time when the information is to be fed back, and the AP informs the STAs of the values thereof through the NDP sounding channel field 1010, the feedback TX channel field 1020, and the feedback TX start time field 1030. The NDP sounding channel field 1010 indicates the channel information that the STA is to feed back. The feedback frame TX channel field 1020 indicates the channel through which the channel information is transmitted. The feedback TX start time field 1030 indicates the time when the channel information is to be transmitted.

Referring to FIG. 10B, STA information 1000B includes a feedback TX order field 1032 instead of the feedback TX start time field 1030 of FIG. 10A. The feedback TX order field 1032 includes information that indicates the order in which the STA feeds back the channel information in the corresponding channel.

Referring to FIG. 10A, the AP recognizes the amount of feedback information of each STA, and determines and transmits the NDP sounding channel field 1010, the feedback TX channel field 1020, and the feedback TX start time field 1030 of each STA, such that the feedback end times match. The AP may divide the whole channel of the NDP sounding channel and the feedback TX channel by a minimum frequency resource unit to thereby display the same as a bitmap.

Figure 11A:
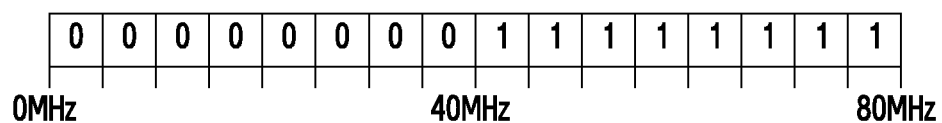
Figure 11C:
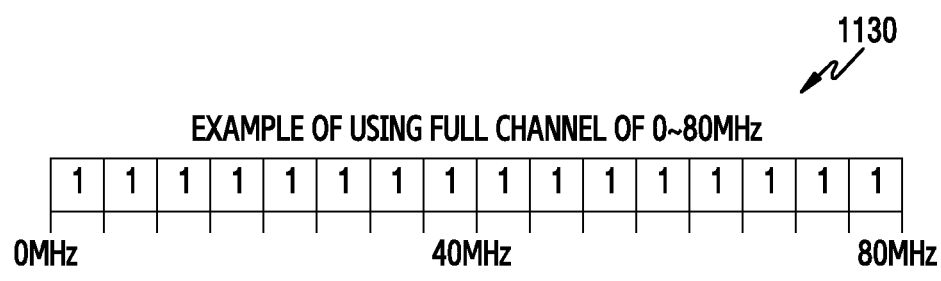

For example, referring to FIG. 11A to FIG. 11C, the AP may divide the channel of 80 MHz by a minimum frequency resource unit of 5 MHz to thereby display 16 sub-channels in a bitmap structure. It is possible to express a frequency resource that is continuously allocated (a continuous channel 1110 of 40-80 MHz in FIG. 11A, and a whole channel 1130 of 0-80 MHz in FIG. 11C), or a frequency resource that is discontinuously allocated (a discontinuous channel 1120 of 0-10 MHz and 20-30 MHz in FIG. 11B)

Referring back to FIGS. 10A and 10B, unlike FIGS. 8A and 8B, and FIGS. 9A and 9B in which one bit is added into the feedback type in order to display whether all or some of the channel information is to be fed back, it is possible to display whether all or some of the channel information is to be fed back in the NDP sounding channel field 1010 without additional information.

As described above, an embodiment of the present disclosure may efficiently use the channel information feedback resources through the frames that are shown in FIGS. 8A and 8B, FIGS. 9A and 9B, and FIGS. 10A and 10B. As a result, the embodiment of the present disclosure allows resources that have been wasted in FIG. 2A to be used by other STAs, as shown in FIG. 3A, to thereby complete the channel information feedback process without a waste of resources.

Figure 3A:
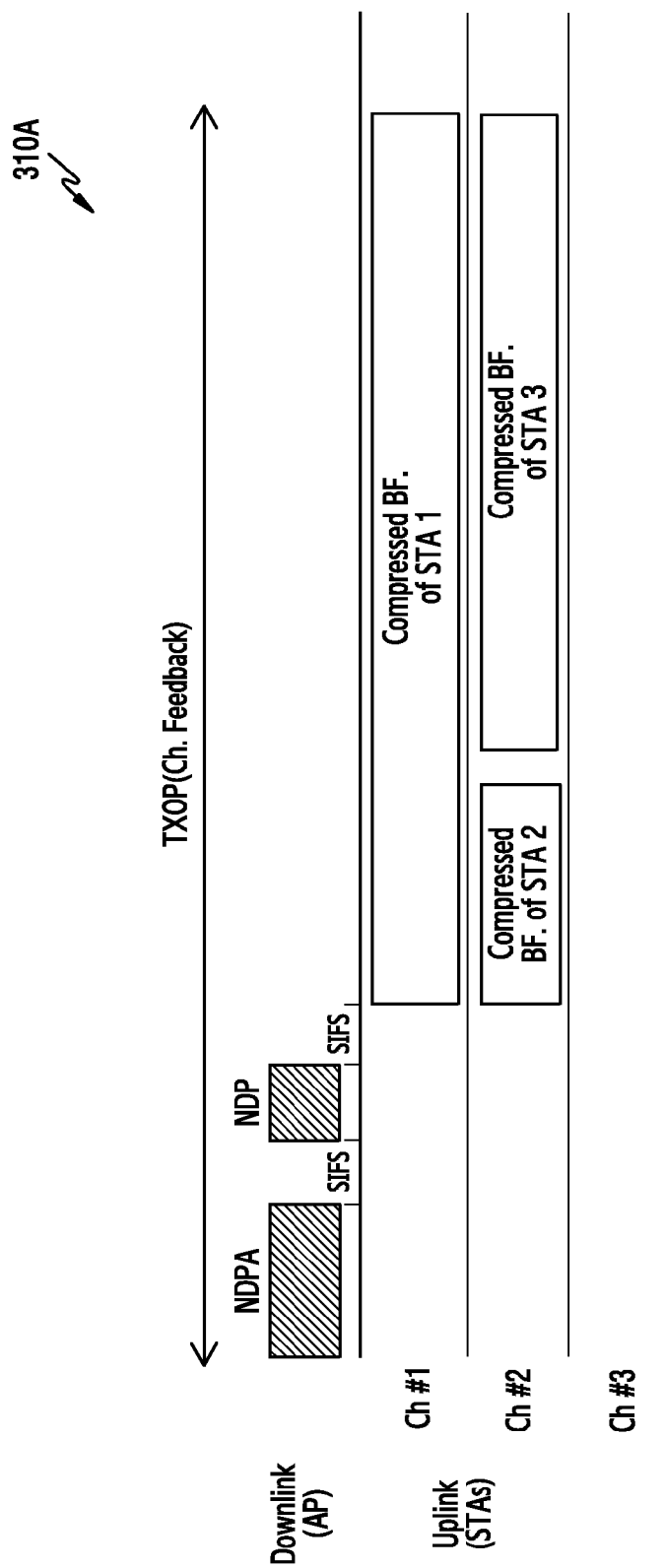
FIG. 3A and FIG. 3B are diagrams illustrating channel information feedback in a wireless communication system, according to an embodiment of the present disclosure.
Figure 3B:
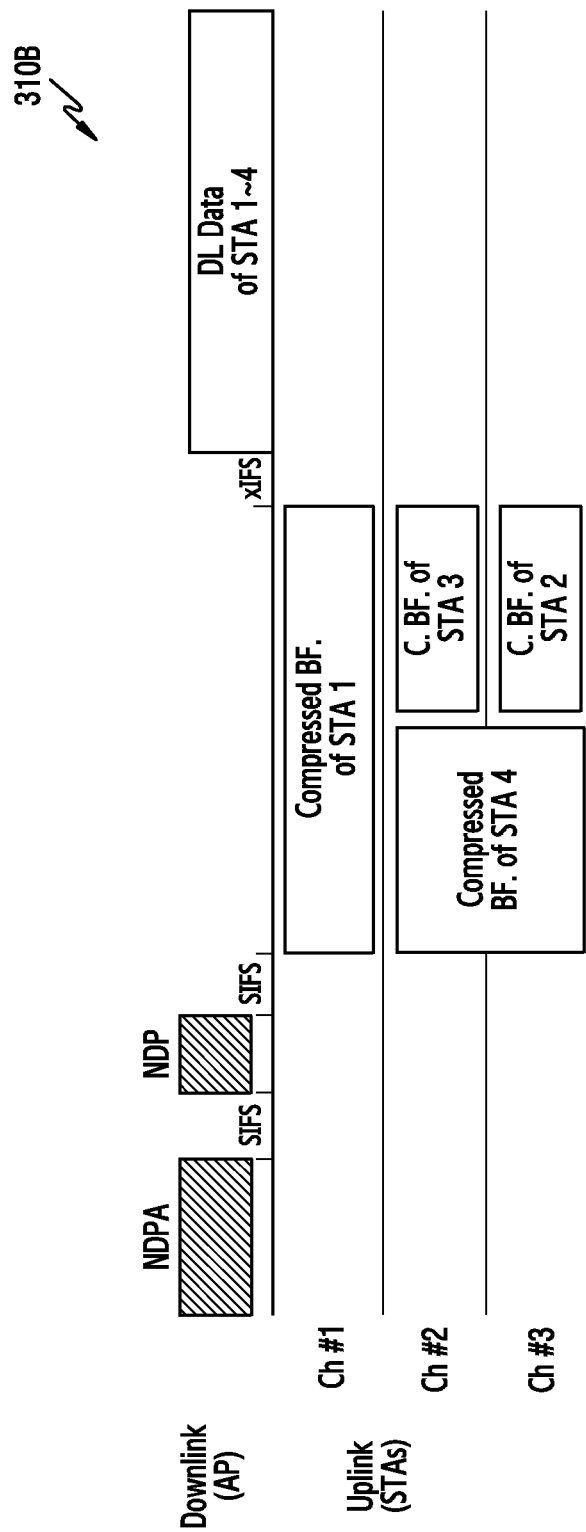

Referring to FIG. 3A, if STA 2 and STA 3 provide feedback in sequence in a single resource, the interval between the previous feedback and the next feedback may be adjusted according to the situation. For example, if there is no interference at all in a surrounding area, the STA3 immediately starts the transmission at the start time that is received from the NDPA, and does not care who previously transmitted the feedback. However, if there are many sources of interference in a surrounding area, the STA3 transmits the feedback after the SIFS time from the end of feedback of the STA 2. In this case, it may operate in two ways as follows.

First, the STA checks the channel by the start time that is specified in the NDPA, and if the time when a short inner frame space (SIPS) time expires matches the start time after the channel becomes idle, the STA transmits the feedback. If the transmission time is earlier or later than the start time, the effect of interference may occur, so the transmission may be avoided.

Second, if the NDPA does not display the start time, and only displays its own transmission order, that is, if the feedback TX start time is replaced by the feedback TX order, the STA recognizes only its own transmission order, and checks the channel. Then, when the channel becomes idle, the STA transmits the feedback after the SIFS time expires. As described above, the method of transmitting the feedback after the SIFS time may help in reducing the effect of interference.

As set forth above, in order to match the OFDMA feedback end time between the STAs, the AP is required to accurately recognize the amount of feedback information of each STA. The amount of feedback information may be influenced by the number of antennas, the number of channels to be fed back, the allocated channel information, the channel state, or the like. The number of antennas may be recognized through an exchange of capability information elements between the AP and the STA, and the number of channels to be fed back may be recognized through an exchange of a feedback type of the NDPA between the AP and the STA. The allocated channel information may be recognized through an exchange of the SIG information of the PHY frame between the AP and the STA, and the channel state may be recognized through an exchange of data between the AP and the STA. However, the feedback bit numbers $\Phi$ and $\Psi$ are fed back as 5 or 7 bits, or 7 or 9 bits, respectively, and the difference may cause a difference of 33% in the amount of feedback information. Although such a difference is not a great value, if this is a problem, one bit is enough to add a field that shows bits of $\Phi$ and $\Psi$ to the capability information elements. In addition, since $\Phi$ and $\Psi$ are not variable in the STA, but are unique values that are used in the feedback process of the STA, even though there is no method of reporting the values of $\Phi$ and $\Psi$ to the AP, if the STAs perform the feedback once, the values can be recognized by the AP, and thereafter it does not matter.

Figure 14:
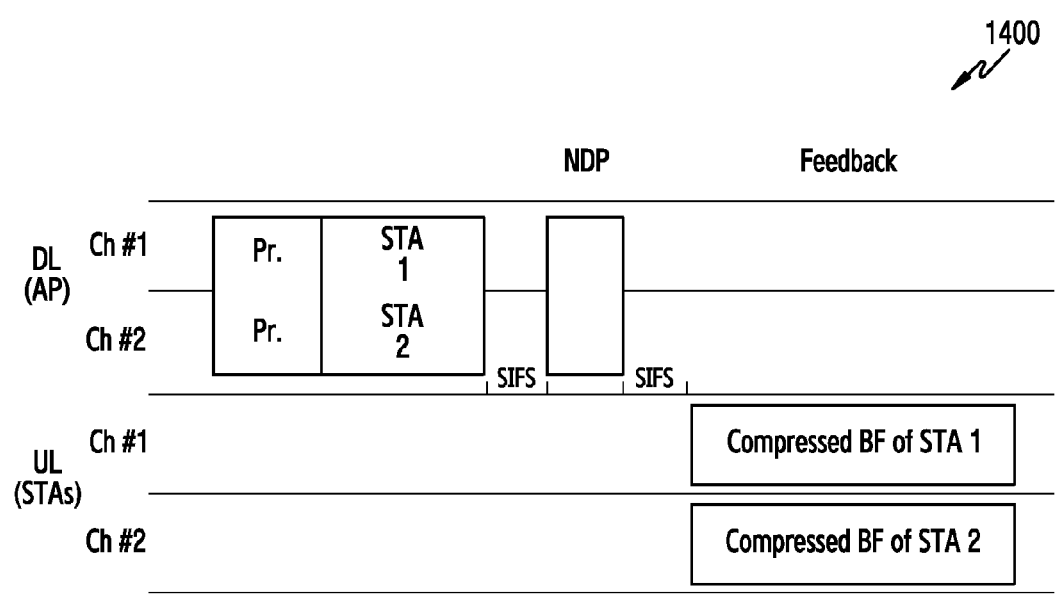
FIG. 14 is a diagram illustrating frame transmission/reception in the first device and the second device of a wireless communication system, according to another embodiment of the present disclosure.

Embodiments of the present disclosure relating to a channel feedback method for preventing a waste of resources are illustrated in FIG. 12 to FIG. 14. Each embodiment corresponds to an example in which the first device transmits the SAT information to the second device, and the embodiments differ in the method of delivering the corresponding STA information by the NDPA. For example, the first device may be the AP 100 of the WLAN environment as shown in FIG. 1, which supports the MU-MIMO scheme and the OFDMA scheme, and the second device may be the STAs 201 to 20N.

FIG. 12 is a diagram illustrating a method 1200 in which the AP duplicates all of the STA information in a minimum resource unit in the NDPA, and sends the same to the STA, according to an embodiment of the present disclosure. All of the STA information STA 1-2 is transmitted through channel #2 as well as channel #1, which is the primary channel.

FIG. 13 is a diagram illustrating a method 1300 in which the AP transmits all of the STA information in the NDPA to the STAs through only the primary channel, according to an embodiment of the present disclosure. All of the STA information STA 1-2 is transmitted through the primary channel #1.

FIG. 14 is a diagram illustrating a method 1400 in which the AP transmits only the STA information, which uses the corresponding channel, in the NDPA through the corresponding channel, according to an embodiment of the present disclosure. The STA information STA 1 is transmitted through the channel #1, and the STA information STA 2 is transmitted through the channel #2.

The embodiments shown in FIG. 12 and FIG. 13 may be used with the STA information shown in FIGS. 9A and 9B, and the embodiment shown in FIG. 14 may be used with the STA information shown in FIGS. 8A and 8B. Although the embodiments shown in FIG. 12 to FIG. 14 show examples of the transmission through only the OFDMA scheme, the present disclosure is not limited thereto, and it should be noted that it can be easily extended because the proposed method can be used independently for each spatial stream, even in a state in which the MIMO and the OFDMA are combined.

According to the embodiment of the present disclosure in which the channel feedback operation prevents the resource from being occupied by another STA, there may be MAC frame structures for channel information feedback. In one method, the STA that is to make the feedback is designated based on a GID. In another method, the STA that is to make the feedback is designated based on an AID. It is assumed that the GID of the STA, the user position, and the user band are known in the GID-based method. This method may be implemented through an exchange of an extended group ID management frame. The AID-based method does not require special preliminary information. Hereinafter, an MAC frame necessary for each method will be defined, and a frame delivery method and the process thereof will be described.

Figure 15:
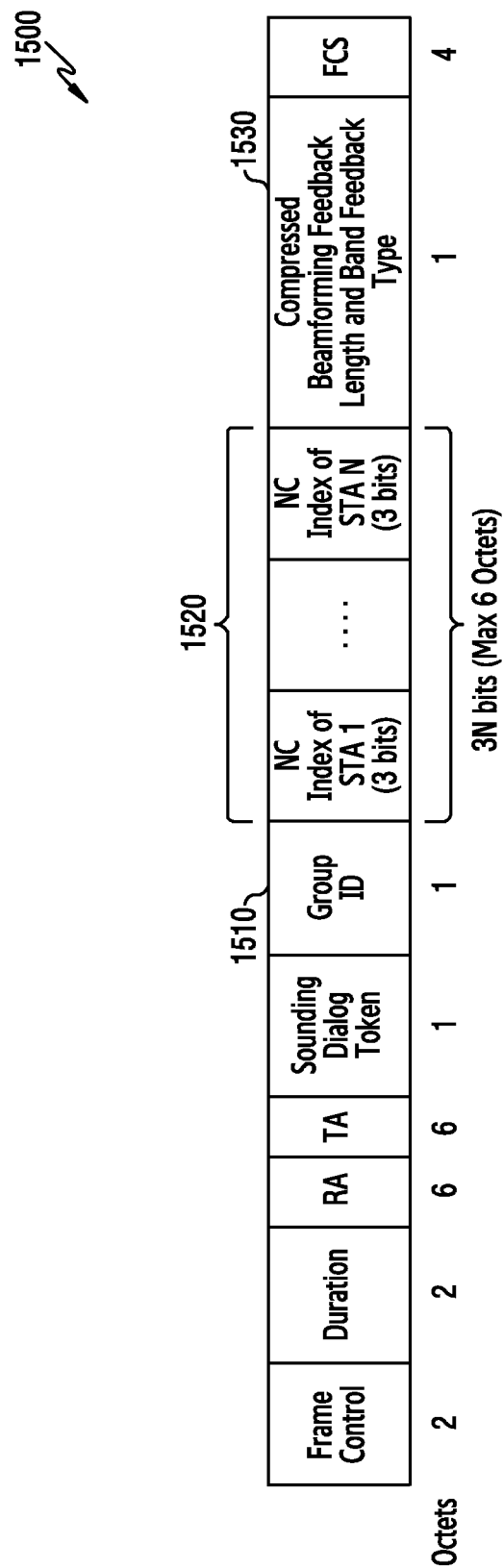
FIG. 15 is a diagram illustrating a media access control (MAC) frame that is created by the first device of a wireless communication system, according to an embodiment of the present disclosure.

FIG. 15 is a diagram illustrating an example of an MAC frame that is generated by the first device of a wireless communication system, according to an embodiment of the present disclosure. For example, the first device may be the AP 100 of the WLAN environment as shown in FIG. 1, which supports the MU-MIMO scheme and the OFDMA scheme.

Referring to FIG. 15, an NDPA frame 1500, as the MAC frame, includes a frame control duration field, a receiver address (RA) field, a transmitter address (TA) field, a sounding dialog token field, a group ID field 1510, an Nc index field 1520, a compressed beamforming feedback length and band feedback type field 1530, and a frame check sequence (FCS) field. The Nc index field indicates the number of columns of a compressed beamforming matrix.

The AP displays the STAs that are to feed back the channel information in the frame transmission process through the group ID 1510. The RA field is the address of a receiving STA in the case of a single user (SU), and is a broadcasting address in the case of MU. The Nc index 1520 is a value enumerated by allocating the number of spatial streams allocated to the STAs that belong to the group with 3 bits for each. The compressed beamforming feedback length 1530 refers to the length of a feedback frame when the STAs feed back the channel information. The band feedback type 1530 refers to a value regarding whether the feedback is to be made with respect to only the currently allocated bands or with respect to all of the bands. The compressed beamforming feedback length 1530 may be determined based on the bandwidth, the number of reception antennas, and the number of spatial streams, and may be expressed by the actual time, the number of symbols, a multiple of a certain time unit, or the like.

Figure 17:
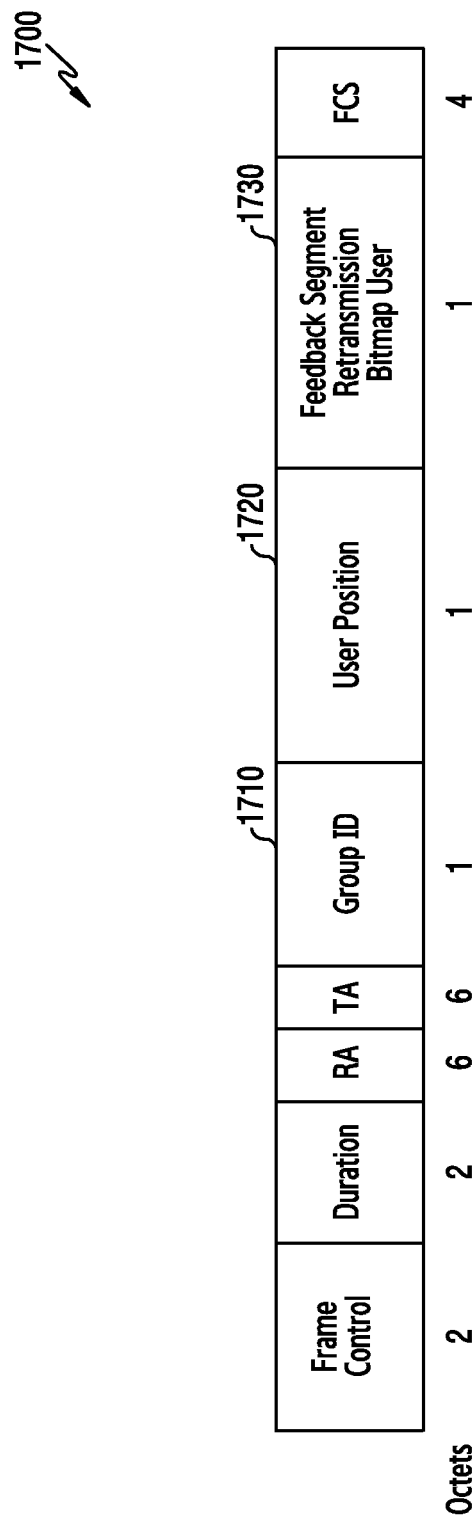
FIG. 17 is a diagram illustrating a MAC frame that is created by the first device of a wireless communication system, according to another embodiment of the present disclosure.

FIG. 17 is a diagram illustrating a MAC frame that is generated by the first device of a wireless communication system, according to another embodiment of the present disclosure. For example, the first device may be the AP 100 of the WLAN environment as shown in FIG. 1, which supports the MU-MIMO scheme and the OFDMA scheme.

Referring to FIG. 17, a beamforming report poll (BRP) frame 1700, as the MAC frame, includes a frame control duration field, an RA field, a TA field, a sounding dialog token field, a group ID field 1710, a user position field 1720, a feedback segment retransmission bitmap user field 1730, and an FCS field.

The BRP frame 1700 may include the address of the STA that receives the frame and feeds back the channel information. According to the first example, the address of the receiving STA may be included in the RA field. In this case, the group ID field 1710, and user position field 1720 need not to be used. This corresponds to a case in which the same frame as the BRP frame of the conventional IEEE 802.11ac is transmitted to each sub-band. According to the second example, the RA field may include the broadcasting address, and the STAs, which are shown in the group ID field 1710, and the user position field 1720, are to feed back the channel information.

FIGS. 18A and 18B are diagrams illustrating a MAC frame that is generated by the second device of a wireless communication system, according to an embodiment of the present disclosure. For example, the second device may be the STAs 201 to 20N of the WLAN environment as shown in FIG. 1, which supports the MU-MIMO scheme and the OFDMA scheme.

Referring to FIG. 18A, a compressed beamforming frame 1800, as the MAC frame, includes a category field, a high efficiency (HE) action field, an HE MIMO control field, an HE compress beamforming report field, and an MU exclusive beamforming report field.

Referring to FIG. 18B, an HE MIMO control field 1830 includes an Nc index field, an Nr index field, a channel width field, a grouping field, a codebook information field, a feedback type field, a remaining feedback segment field, a first feedback segment field, a reserved field, and a sounding dialog token field. Unlike the conventional IEEE 802.11ac that only has bands of 20, 40, 80, and 160 MHz, if the OFDMA is supported, since the sub-bands, such as, for example, 5 MHz or 10 MHz, can be provided, the bits need to increase in order to express the frequencies that have a variety of channel widths. This may be achieved by utilizing 2 bits in the reserved field of the conventional IEEE 802.11ac. That is, various frequencies (or sub-bands) that are supported in the OFDMA scheme may be expressed by using the channel width field and the reserved field.

The channel information may be fed back through the frame transmission process as shown in FIG. 9 to FIG. 12, based on the MAC frame defined above.

Figure 16:
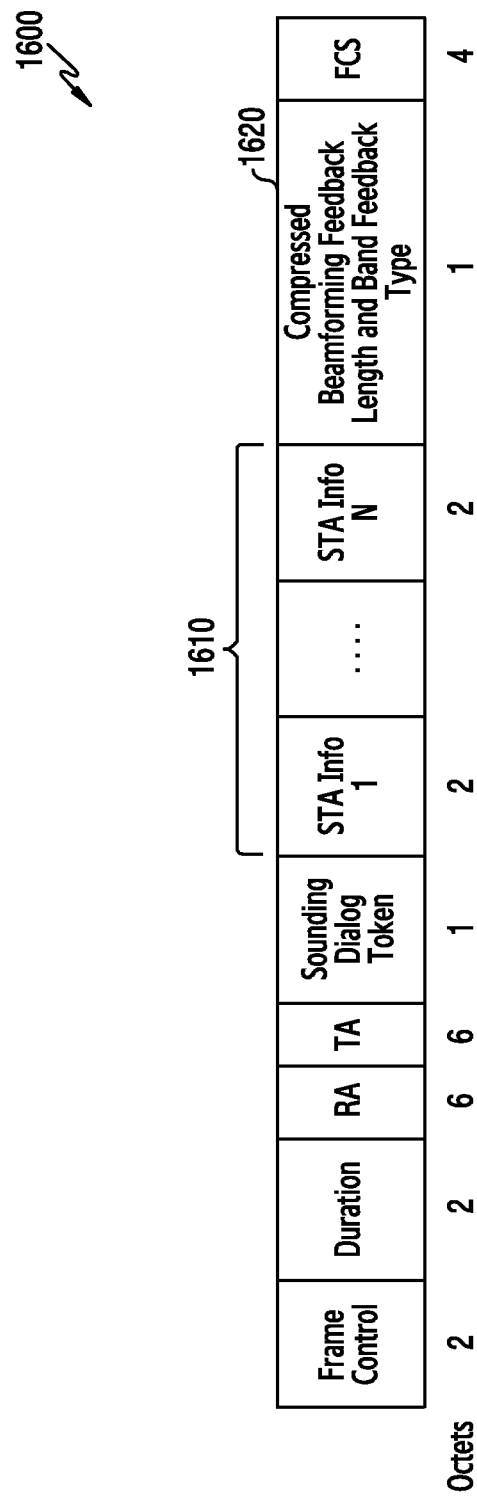
FIG. 16 is a diagram illustrating a MAC frame that is created by the first device of a wireless communication system, according to another embodiment of the present disclosure.

FIG. 16 is a diagram illustrating a MAC frame 1600 that is generated by the first device of a wireless communication system, according to an embodiment of the present disclosure. For example, the first device may be the AP 100 of the WLAN environment as shown in FIG. 1, which supports the MU-MIMO scheme and the OFDMA scheme.

Referring to FIG. 16, an NDPA frame 1600, as the MAC frame, includes a frame control field, a duration field, an RA field, a TA field, a sounding dialog token field, STA information fields 1610, a compressed beamforming feedback length and band feedback field 1620, and an FCS field.

The AP displays the STAs, which are to feed back the channel information, through each associated ID. The STA information field 1610 includes fields that store the AID for each of a plurality of STAs (e.g., N STAs). The RA field is the address of a receiving STA in the case of an SU, and is a broadcasting address in the case of MU. The STA info fields 1610 include the AID and the Nc information of each STA. The compressed beamforming feedback length 1620 refers to the length of a feedback frame when the STAs feed back the channel information. The band feedback type 1620 indicates a value regarding whether the feedback is to be made with respect to only the currently allocated bands or with respect to all of the bands. Like the GID-based method, the compressed beamforming feedback length 1620 may be determined based on the bandwidth, the number of reception antennas, and the number of spatial streams, and may be expressed by the actual time, the number of symbols, a multiple of a certain time unit, or the like.

Figure 19:
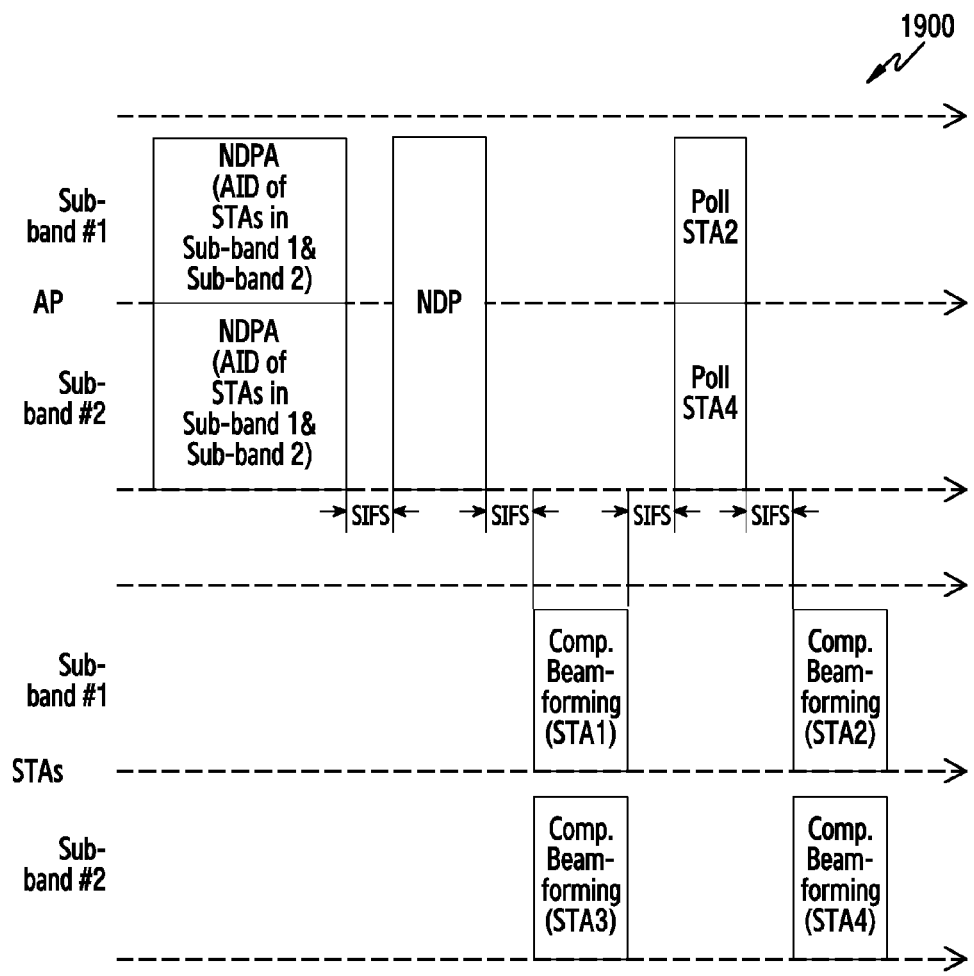
FIG. 19 is a diagram illustrating frame transmission/reception in the first device and the second device of a wireless communication system, according to another embodiment of the present disclosure.

FIG. 19 is a diagram illustrating frame transmission/reception in the first device and the second device of a wireless communication system, according to an embodiment of the present disclosure. For example, the first device may be the AP 100 of the WLAN environment as shown in FIG. 1, which supports the MU-MIMO scheme and the OFDMA scheme, and the second device may be the STAs 201 to 20N. FIG. 19 corresponds to the case in which the AP transmits the NDPA frame to the STAs, and the STAs feed back the multi-STA channel information.

Referring to FIG. 19, the transmitting/receiving operation is performed in a WLAN network that has one AP and four STAs. The access point AP performs the channel estimation sequence (sounding sequence) using an NDP in order to estimate the channel of the four STAs.

In FIG. 19, the AP creates the NDPA frame that contains the information that makes a request to STA 1 to STA 4 for the channel estimation, and duplicates and transmits the same NDPA frame through the available sub-bands #1 and #2. It is assumed that the information indicating the sub-band, through which each STA feeds back the channel information, is contained in the preamble of the NDPA.

After transmitting the NDPA, the AP transmits the NDP frame, and waits for a compressed beamforming frame containing the channel information.

When the NDPA is received, the STAs recognize the sub-band through which the STAs feed back the channel information and the channel information to be fad back, and checks the STA information order included in the NDPA. Then, the STAs, which are appointed first among the STAs of each sub-band, transmit each sub-band channel information after an SIFS. It is assumed that the sub-band, by which the STAs measure the channel information, is identical to the sub-band through which the channel information is to be transmitted.

The AP receives the channel information of the first STAs (STA 1 and STA 3) through each sub-band, and transmits polling frames for requesting the channel information to the second STAs (STA 2 and STA 4) of each sub-band. It is assumed that polling frames transmitted through each sub-band are transmitted in such a manner that the MAC frames, which have different receiver addresses (RA), are transmitted through different sub-bands, for example, by using a DL-OFDMA scheme.

Among the STAs, the STAs (STA 2 and STA 4), which are appointed by the polling frame, transmit respective sub-band channel information after a SIFS.

Although it is assumed in FIG. 19 that the information indicating the sub-band, through which each STA feeds back the channel information, is contained in the preamble of the NDPA, it is apparent that this information may be known in advance through another frame, or may be contained in another portion other than the preamble of the NDPA.

In addition, although it is assumed in FIG. 19 that the sub-band, through which the STAs measure the channel information, is identical to the sub-band through which the channel information is to be transmitted, it is apparent that they may not be identical to each other, and the information about all of the sub-bands that can be used by the STA may be included.

Figure 20:
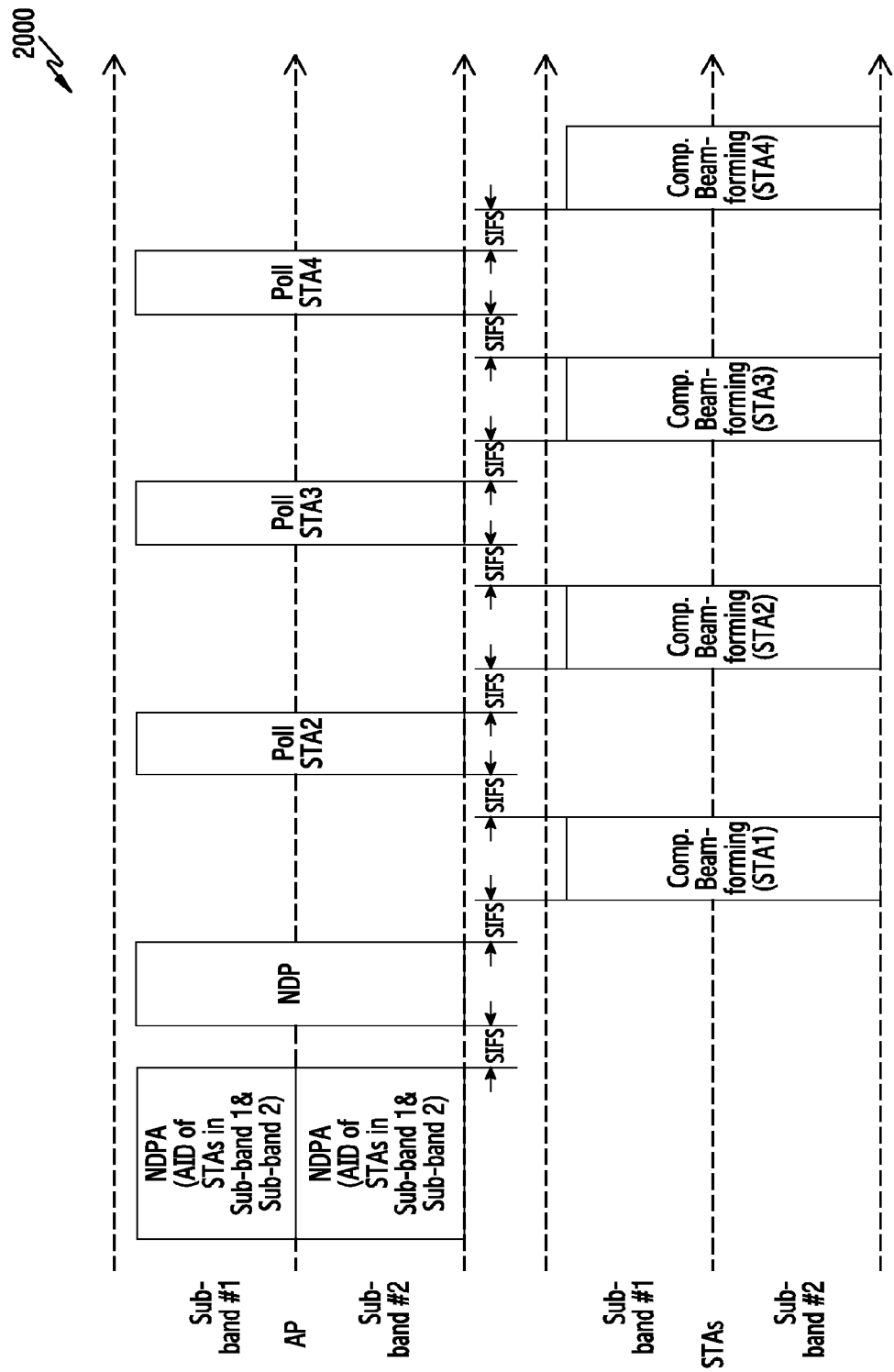
FIG. 20 is a diagram illustrating frame transmission/reception in the first device and the second device of a wireless communication system, according to another embodiment of the present disclosure.

FIG. 20 is a diagram illustrating frame transmission/reception in the first device and the second device of a wireless communication system, according to another embodiment of the present disclosure. For example, the first device may be the AP 100 of the WLAN environment as shown in FIG. 1, which supports the MU-MIMO scheme and the OFDMA scheme, and the second device may be the STAs 201 to 20N. This example corresponds to the case where the AP transmits the NDPA frame to the STAs, and the STAs feed back the multi-STA channel information.

Referring to FIG. 20, a transmitting/receiving operation is performed in the WLAN network that has one AP and four STAs. The AP performs the channel estimation sequence (sounding sequence) using an NDP in order to estimate the channel of the four STAs.

In FIG. 20, the AP creates the NDPA frame that contains the information that makes a request to STA 1 to STA 4 for the channel estimation, and duplicates and transmits the same NDPA frame through the available sub-bands #1 and #2.

After transmitting the NDPA, the AP transmits the NDP frame, and waits for a compressed beamforming frame containing the channel information.

When the NDPA is received, the STAs check the STA information order included in the NDPA, and the STA, which is appointed first (or which has a smallest association ID), transmits all of the available sub-band channel information after an SIFS.

The AP receives the channel information of the first STA (STA 1) through each sub-band, and transmits the polling frame for requesting the channel information to the next STA (STA 2). This transmission/reception operation may be performed with respect to a plurality of STAs (STA 1 to STA 4).

Among the STAs, the STA, which is appointed by the polling frame, transmits all of the available sub-band channel information after an SIFS.

Although it is assumed in FIG. 20 that each STA feeds back the channel information of an available sub-band, it is apparent that the number of available sub-bands may be different depending on the STAs.

In addition, although it is assumed in FIG. 20 that the AP transmits the polling frame for requesting the channel information by using all of the available sub-bands, it is apparent that the polling frame may be transmitted by using only some of the sub-bands.

Figure 21:
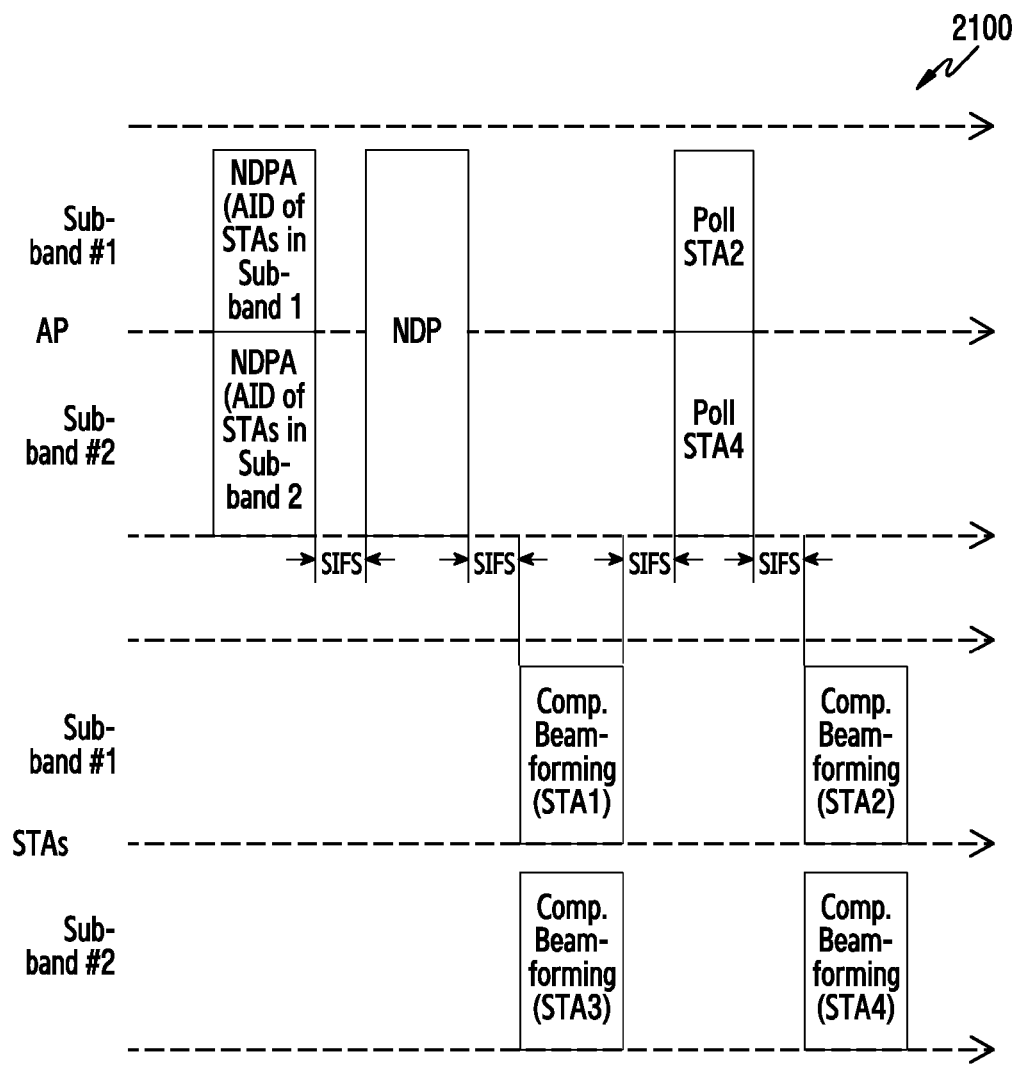
FIG. 21 is a diagram illustrating frame transmission/reception in the first device and the second device of a wireless communication system, according to another embodiment of the present disclosure.

FIG. 21 is a diagram illustrating frame transmission/reception in the first device and the second device of a wireless communication system, according to another embodiment of the present disclosure. For example, the first device may be the AP 100 of the WLAN environment as shown in FIG. 1, which supports the MU-MIMO scheme and the OFDMA scheme, and the second device may be the STAs 201 to 20N. This example corresponds to the case where the AP transmits the NDPA frame to the STAs, and the STAs feed back the multi-STA channel information.

Referring to FIG. 21, the transmitting/receiving operation is performed in a WLAN network that has one AP and four STAs. The AP performs the channel estimation sequence (sounding sequence) using an NDP in order to estimate the channel of the four STAs.

In FIG. 21, the AP creates the NDPA frame that contains the information that makes a request to STA 1 to STA 4 for the channel estimation, and separates different NDPA frames according to the available sub-bands to thereby transmit the same by using, for example, the DL-OFDMA scheme. It is assumed that the AP recognizes which sub-bands the STAs can use. In addition, it is assumed that the information indicating the sub-band, through which each STA feeds back the channel information, is contained in the preamble of the NDPA.

After transmitting the NDPA, the AP transmits the NDP frame, and waits for a compressed beamforming frame containing the channel information.

When the NDPA is received, the STAs recognize the sub-band through which the STAs feed back the channel information and the channel information to be fed back, and check the STA information order included in the NDPA. Then, the STAs (STA 1 and STA 3), which are appointed first among STAs of each sub-band, transmit sub-band channel information after an SIFS. It is assumed that the sub-band, by which the STAs measure the channel information, is identical to the sub-band through which the channel information is to be transmitted.

The AP receives the channel information of the first STAs (STA 1 and STA 3) through each sub-band, and transmits the polling frames for requesting the channel information to the second STAs (STA 2 and STA 4) of each sub-band. It is assumed that polling frames to be transmitted through each sub-band are transmitted in such a manner that the MAC frames, which have different RAs, are transmitted through different sub-bands, for example, by using the DL-OFDMA scheme.

Among the STAs, the STAs (STA 2 and STA 4), which are appointed by the polling frame, transmit sub-band channel information after a SIFS.

Although it is assumed in FIG. 21 that the information indicating the sub-band through which each STA feeds back the channel information is contained in the preamble of the NDPA, it is apparent that this information may be known in advance through another frame, or may be contained in another portion other than the preamble of the NDPA.

In addition, although it is assumed in FIG. 21 that the sub-band, through which the STAs measure the channel information, is identical to the sub-band through which the channel information is to be transmitted, it is apparent that they may not be identical to each other, and the information about all of the sub-bands that can be used by the STA may be included.

Figure 22:
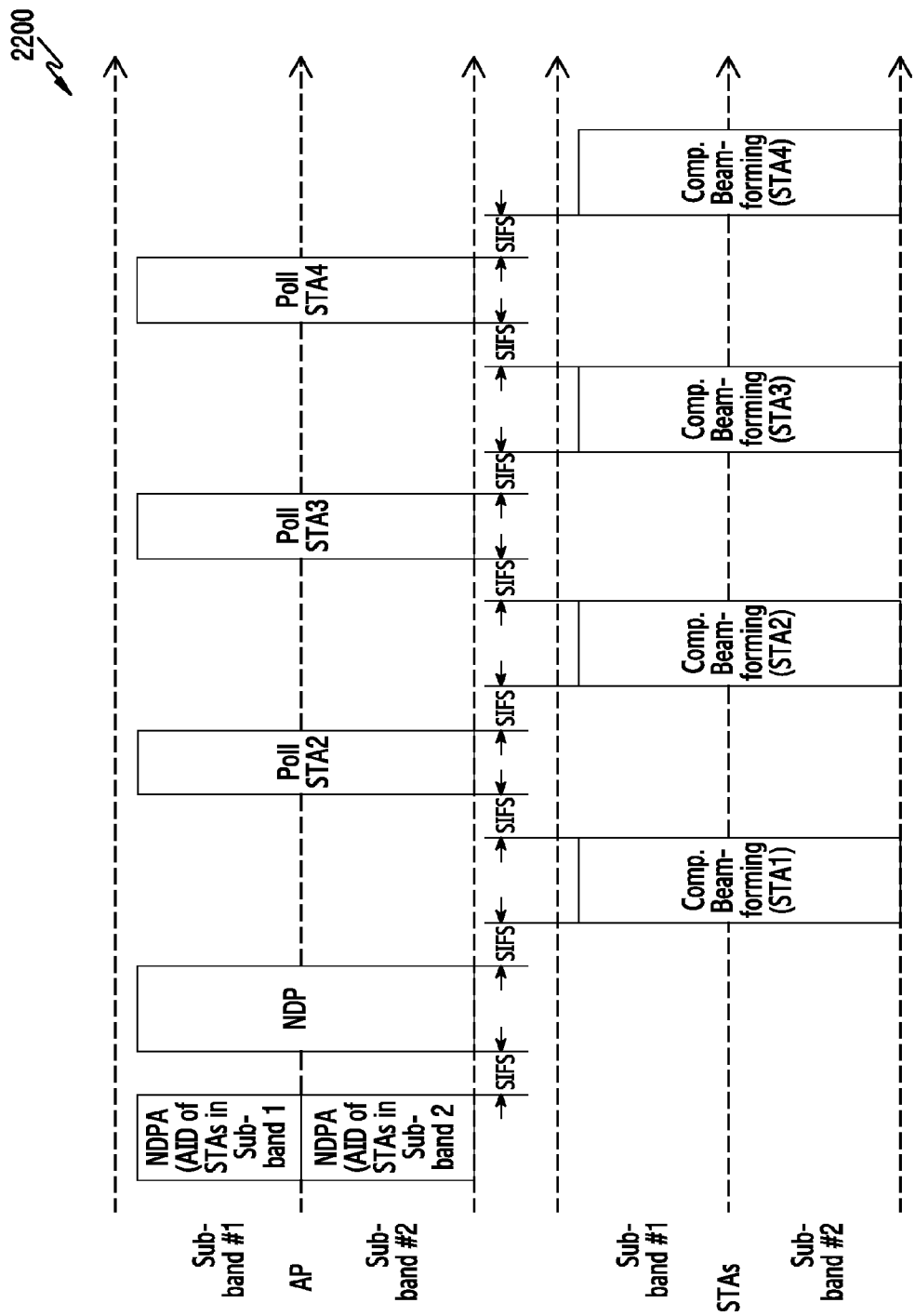
FIG. 22 is a diagram illustrating frame transmission/reception in the first device and the second device of a wireless communication system, according to another embodiment of the present disclosure.

FIG. 22 is a diagram illustrating frame transmission/reception in the first device and the second device of a wireless communication system, according to another embodiment of the present disclosure. For example, the first device may be the AP 100 of the WLAN environment as shown in FIG. 1, which supports the MU-MIMO scheme and the OFDMA scheme, and the second device may be the STAs 201 to 20N. This example corresponds to the case where the AP transmits the NDPA frame to the STAs, and the STAs feed back the multi-STA channel information.

Referring to FIG. 22, the transmitting/receiving operation is performed in a WLAN network that has one AP and four STAs. The AP performs the channel estimation sequence (sounding sequence) using an NDP in order to estimate the channel of the four STAs.

In FIG. 22, the AP creates an NDPA frame that contains information that makes a request to STA 1 to STA 4 for the channel estimation, and separates different NDPA frames according to the available sub-bands to thereby transmit the same by using, for example, the DL-OFDMA. It is assumed that the AP recognizes which sub-bands the STAs can use. In addition, it is assumed that the information indicating the sub-band, through which each STA feeds back the channel information, is contained in the preamble of the NDPA.

After transmitting the NDPA, the AP transmits the NDP frame, and waits for a compressed beamforming frame containing the channel information.

When the NDPA is received, the STAs check the STA information order included in the NDPA, and the STA, which is appointed first (or which has a smallest association ID), transmits all of the available sub-band channel information after an SIFS.

The AP receives the channel information of the first STA (STA 1) through each sub-band, and transmits the polling frame requesting the channel information to the next STA. This transmission/reception operation may be performed with respect to a plurality of STAs (STA 1 to STA 4).

Among the STAs, the STA, which is appointed by the polling frame, transmits all of the available sub-band channel information after an SIFS.

Although it is assumed in FIG. 22 that each STA feeds back the channel information of the available sub-bands, it is apparent that the number of available sub-bands may be different depending on the STAs.

In addition, although it is assumed in FIG. 22 that the AP transmits the polling frame for requesting the channel information by using all of the available sub-bands, it is apparent that the polling frame may be transmitted by using only some of the sub-bands.

Figure 23:
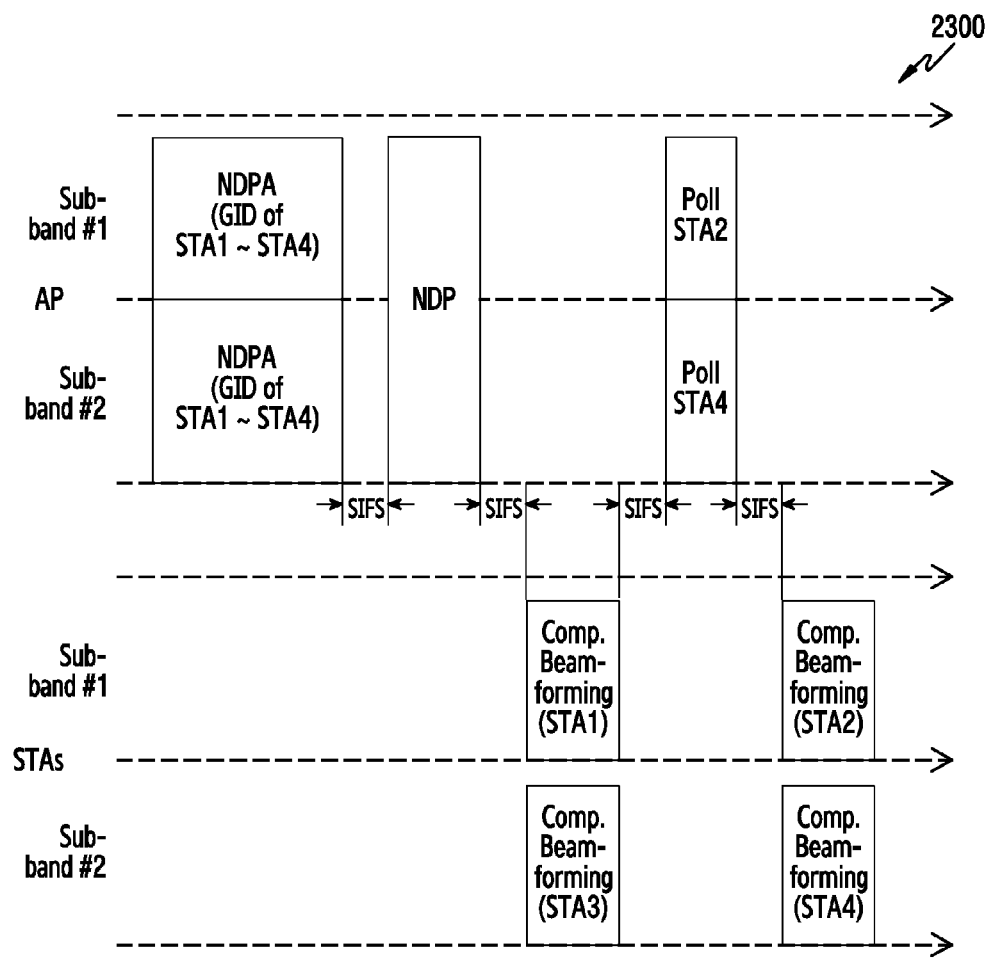
FIG. 23 is a diagram illustrating frame transmission/reception in the first device and the second device of a wireless communication system, according to another embodiment of the present disclosure.

FIG. 23 is a diagram illustrating frame transmission/reception in the first device and the second device of a wireless communication system, according to another embodiment of the present disclosure. For example, the first device may be the AP 100 of the WLAN environment as shown in FIG. 1, which supports the MU-MIMO scheme and the OFDMA scheme, and the second device may be the STAs 201 to 20N. This example corresponds to the case where the AP transmits the NDPA frame to the STAs, and the STAs feed back the multi-STA channel information.

Referring to FIG. 23, the transmitting/receiving operation is performed in a WLAN network that has one AP and four STAs. It is assumed that the STAs belong to a single group. The AP performs a channel estimation sequence (sounding sequence) using an NDP in order to estimate the channel of the four STAs that belong to the group.

In FIG. 23, the AP creates an NDPA frame containing the GID, which makes a request to STA 1 to STA 4 for the channel estimation, and duplicates and transmits the same NDPA frame through the available sub-bands. It is assumed that the AP recognizes which sub-bands the STAs can use. In addition, it is assumed that the information indicating the sub-band, through which each STA feeds back the channel information, is contained in the preamble of the NDPA.

After transmitting the NDPA, the AP transmits the NDP frame, and waits for a compressed beamforming frame containing the channel information.

When the NDPA is received, the STAs recognize the sub-band, through which the STAs feed back the channel information, and the channel information to be fed back, and check the STA position and order included in the group information. Then, the STAs, which are appointed first (or which have a lowest order) among STAs of each sub-band, transmit each sub-band channel information after an SIFS. It is assumed that the sub-band, by which the STAs measure the channel information, is identical to the sub-band through which the channel information is to be transmitted.

The AP receives the channel information of the first STAs (STA 1 and STA 3) through each sub-band, and transmits the polling frames for requesting the channel information to the second STAs (STA 2 and STA 4) of each sub-band. It is assumed that polling frames to be transmitted through each sub-band are transmitted in such a manner that the MAC frames, which have different RAs, are transmitted through different sub-bands, for example, by using the DL-OFDMA scheme.

Among the STAs, the STAs (STA 2 and STA 4), which are appointed by the polling frame, transmit each sub-band channel information after an SIFS.

Figure 24:
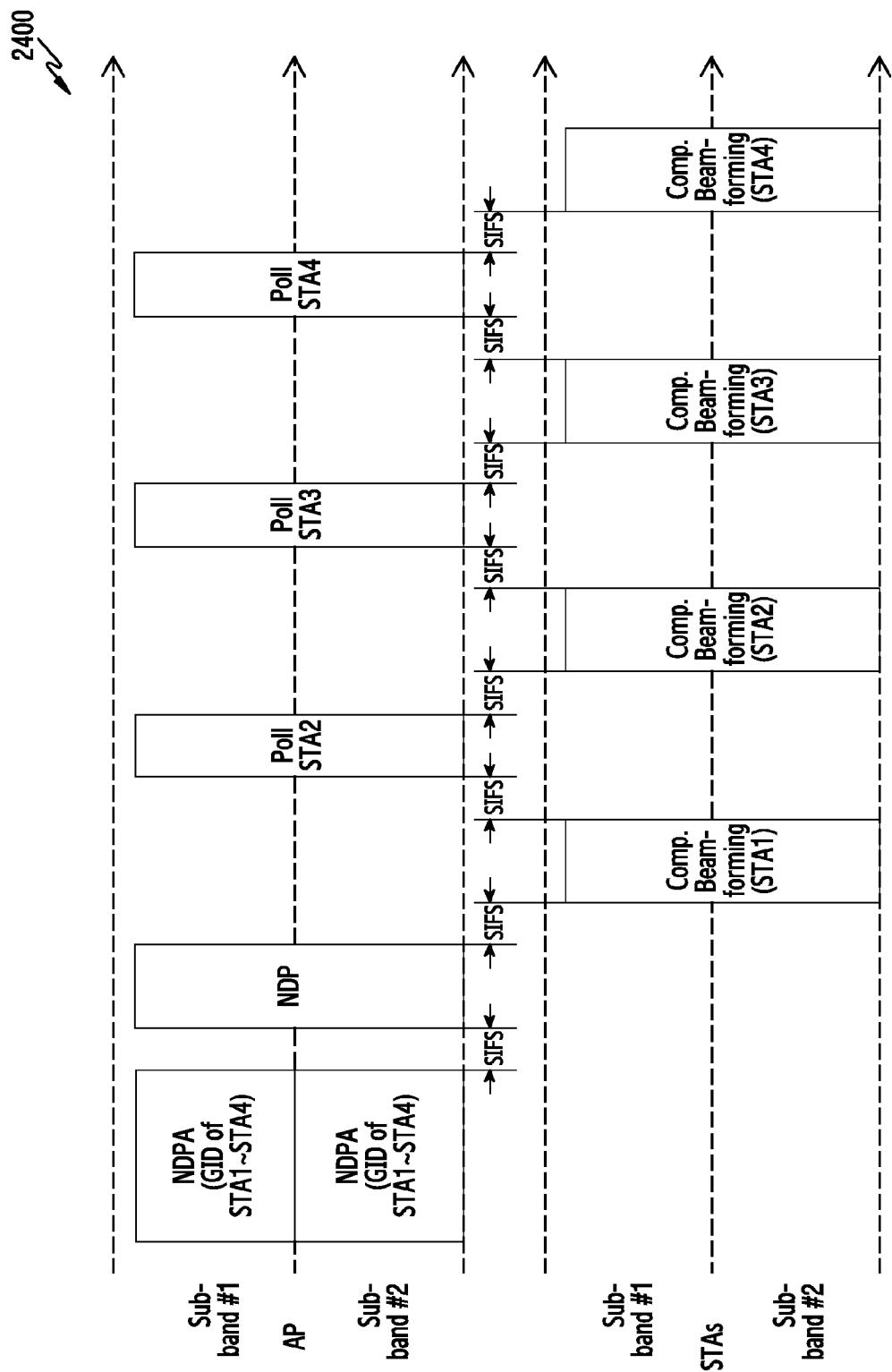
FIG. 24 is a diagram illustrating frame transmission/reception in the first device and the second device of a wireless communication system, according to another embodiment of the present disclosure.

FIG. 24 is a diagram illustrating frame transmission/reception in the first device and the second device of a wireless communication system, according to another embodiment of the present disclosure. For example, the first device may be the AP 100 of the WLAN environment as shown in FIG. 1, which supports the MU-MIMO scheme and the OFDMA scheme, and the second device may be the STAs 201 to 20N. This example corresponds to the case where the AP transmits the NDPA frame to the STAs, and the STAs feed back the multi-STA channel information.

Referring to FIG. 24, the transmitting/receiving operation is performed in a WLAN network that has one AP and four STAs. It is assumed that the STAs belong to a single group. The AP performs the channel estimation sequence (sounding sequence) using an NDP in order to estimate the channel of the four STAs that belong to the group.

In FIG. 24, the AP creates an NDPA frame containing the GID, which makes a request to the group that includes STA 1 to STA 4 for the channel estimation, and duplicates and transmits the same NDPA frame through the available sub-bands. It is assumed in FIG. 24 that the AP recognizes which sub-bands the STAs can use. In addition, it is assumed that the information indicating the sub-band, through which each STA feeds back the channel information, is contained in the preamble of the NDPA.

After transmitting the NDPA, the AP transmits the NDP frame, and waits for a compressed beamforming frame containing the channel information.

When the NDPA is received, the STAs check the STA information order included in the NDPA, and the STA, which is appointed first (or which has a smallest association ID) transmits all of the available sub-band channel information after an SIFS.

The AP receives the channel information of the first STA (STA 1) through each sub-band, and transmits the polling frame for requesting the channel information to the next STA. This transmission/reception operation may be performed with respect to a plurality of STAs (STA 1 to STA 4).

Among the STAs, the STA, which is appointed by the polling frame, transmits all of the available sub-band channel information after an SIFS.

Although it is assumed in FIG. 24 that each STA feeds back the channel information of the available sub-bands, it is apparent that the number of available sub-bands may be different depending on the STAs.

In addition, although it is assumed in FIG. 24 that the AP transmits the polling frame for requesting the channel information by using all of the available sub-bands, it is apparent that the polling frame may be transmitted by using only some of the sub-bands.

Figure 25:
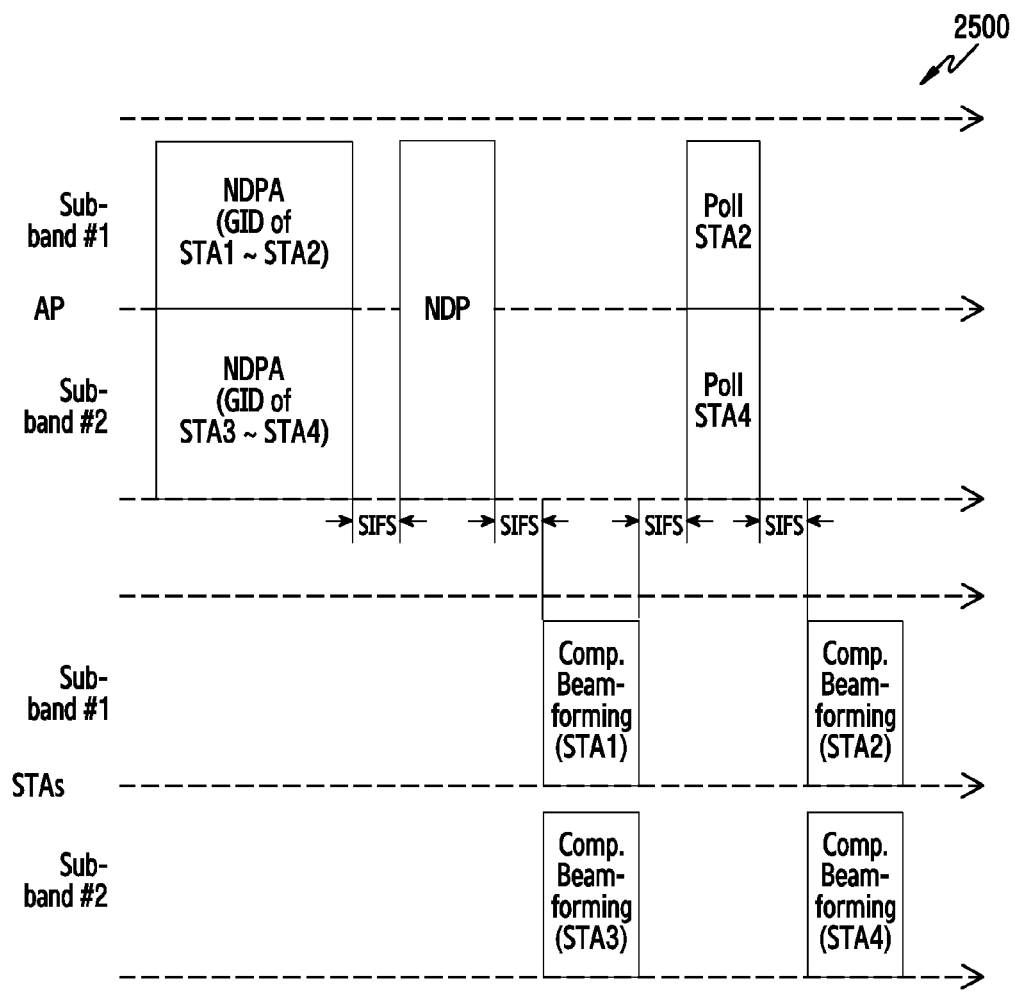
FIG. 25 is a diagram illustrating frame transmission/reception in the first device and the second device of a wireless communication system, according to another embodiment of the present disclosure.

FIG. 25 is a diagram illustrating frame transmission/reception in the first device and the second device of a wireless communication system, according to another embodiment of the present disclosure. For example, the first device may be the AP 100 of the WLAN environment as shown in FIG. 1, which supports the MU-MIMO scheme and the OFDMA scheme, and the second device may be the STAs 201 to 20N. This example corresponds to the case where the AP transmits the NDPA frame to the STAs, and the STAs feed back the multi-STA channel information.

Referring to FIG. 25, the transmitting/receiving operation is performed in a WLAN network that has one AP and four STAs. It is assumed that STA 1 and STA 2 among the STAs belong to one group, and STA 3 and STA 4 belong to another group. The AP performs the channel estimation sequence (sounding sequence) using an NDP in order to estimate the channel of the four STAs that belong to the groups.

In FIG. 25, the AP creates a first NDPA frame containing the GID, which makes a request to the group that includes STA 1 and STA 2 for the channel estimation, and creates a second NDPA frame containing the GID, which makes a request to the group that includes STA 3 and STA 4 for the channel estimation. The AP separates the created two NDPA frames according to the available sub-bands to thereby transmit the same by using, for example, the DL-OFDMA scheme. It is assumed that the AP recognizes which sub-bands the STAs can use, that is, STA 1 and STA 2 use the sub-band #1, and STA 3 and STA 4 use the sub-band #2. In addition, it is assumed that the information indicating the sub-band, through which each STA feeds back the channel information, is contained in the preamble of the NDPA.

After transmitting the NDPA, the AP transmits the NDP frame, and waits for a compressed beamforming frame containing the channel information.

When the NDPA is received, the STAs recognize the sub-band, through which the STAs feed back the channel information, and the channel information to be fed back, and check the STA position and order included in the group information. Then, the STAs, which are appointed first (or which have a lowest order) among STAs of each sub-band, transmit each sub-band channel information after an SIFS. It is assumed that the sub-band, by which the STAs measure the channel information, is identical to the sub-band through which the channel information is to be transmitted.

The AP receives the channel information of the first STAs (STA 1 and STA 3) through each sub-band, and transmits the polling frames for requesting the channel information to the second STAs (STA 2 and STA 4). It is assumed that the polling frames to be transmitted through each sub-band are transmitted in such a manner that the MAC frames, which have different RAs, are transmitted through different sub-bands, for example, by using the DL-OFDMA scheme.

Among the STAs, the STAs (STA 2 and STA 4), which are appointed by the polling frame, transmit each sub-band channel information after an SIFS.

Although it is assumed in FIG. 25 that the information indicating the sub-band, through which each STA feeds back the channel information, is contained in the preamble of the NDPA, it is apparent that this information may be known in advance through another frame, or may be contained in another portion other than the preamble of the NDPA.

In addition, although it is assumed in FIG. 25 that the sub-band, through which the STAs measure the channel information, is identical to the sub-band through which the channel information is to be transmitted, it is apparent that they may not be identical to each other, and the information about all of the sub-bands that can be used by the STA may be included.

As described above, embodiments of the present disclosure can provide a channel situation of each user, or STA, to the AP in a wireless communications environment that uses the MU-MIMO scheme, in which a plurality of users and a plurality of antennas are simultaneously used, and the OFDMA scheme, in which a multi-channel is used.

In addition, embodiments of the present disclosure can provide a channel situation to the AP, such that a service delay of each user, or STA, can be reduced in a wireless communications environment that uses the MU-MIMO scheme, in which a plurality of users and a plurality of antennas are simultaneously used, and the OFDMA scheme, in which a multi-channel is used.

In addition, embodiments of the present disclosure can provide a channel situation to the AP, such that the efficiency of wireless resources for each user, or STA, can be increased in the wireless communications environment that uses the MU-MIMO scheme, in which a plurality of users and a plurality of antennas are simultaneously used, and the OFDMA scheme, in which a multi-channel is used.

Particular aspects of the present disclosure may be implemented as a computer-readable code in a computer-readable recording medium. The computer-readable recording medium is a predetermined data storage device, which can store data that can be read by a computer system. Examples of the computer readable recording medium may include a read-only memory (ROM), a random access memory (RAM), a compact disc-ROM (CD-ROM), a magnetic tape, a floppy disk, an optical data storage device, and a carrier wave (such as data transmission through the Internet). The computer-readable recording medium may be distributed through computer systems connected to the network, and accordingly the computer-readable code is stored and executed in a distributed manner. Further, functional programs, codes, and code segments for achieving the present disclosure may be easily interpreted by programmers skilled in the art to which the present disclosure pertains.

It will be understood that a method and apparatus according to an embodiment of the present disclosure may be implemented in the form of hardware, software, or a combination of hardware and software. Any such software may be stored, for example, in a volatile or non-volatile storage device such as a ROM, a memory such as a RAM, a memory chip, a memory device, or a memory integrated circuit (IC), or a recordable optical or magnetic medium such as a CD, a DVD, a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present disclosure.

Accordingly, the present disclosure includes a program including a code for implementing the apparatus and method described in the appended claims of the specification and a machine (computer or the like)-readable storage medium for storing the program. Further, the program may be electronically transferred by a predetermined medium, such as a communication signal transferred through a wired or wireless connection, and the present disclosure appropriately includes equivalents of the program.

Further, an apparatus according to an embodiment of the present disclosure may receive the program from a program providing device that is wiredly or wirelessly connected thereto, and may store the program. The program providing device may include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device or automatically.

While the disclosure has been shown and described with reference to certain embodiments thereof, it will be understood by those skilled in the art that various changes in form and detail may be made therein without departing from the spirit and scope of the disclosure as defined by the appended claims.

What is claimed is:

1. An operating method of a first device in a wireless communication system, the method comprising:
    determining a timing of transmitting channel information by at least one second device, based on at least one of an estimated amount of the channel information or an estimated completion time of transmitting the channel information;
    transmitting, to the at least one second device, a request message for requesting the channel information, wherein the request message comprises information regarding a channel through which the channel information is transmitted by the at least one second device and information regarding the timing; and
    receiving, from the at least one second device, a response message for the request message comprising the channel information, wherein the response message is transmitted on the timing through the channel by the at least one second device.

2. The method of claim 1, wherein the request message requesting the channel information comprises identification information of the at least one second device, and resource allocating indication information for the channel information.

3. The method of claim 2, wherein the identification information includes information indicating a group to which the at least one second device belongs, or information indicating a sub-band to which the second device belongs.

4. The method of claim 2, wherein the resource allocating indication information includes information indicating the channel information to be fed back, information indicating a channel through which the channel information is to be transmitted, or at least one of information indicating an order in which each of the at least one second device feeds back channel information or information indicating a start time when each of the at least one second device feeds back the channel information.

5. The method of claim 1, wherein transmitting the request message for requesting the channel information comprises duplicating and transmitting the request message for requesting the channel information through all available channels.

6. The method of claim 1, wherein the request message for requesting the channel information is transmitted through a predetermined primary channel or a channel corresponding to the second device.

7. The method of claim 1, wherein the first device comprises an access point, and the second device comprises a station.

8. An operating method of a second device in a wireless communication system, the method comprising:
    receiving, from a first device, a request message for channel information, wherein the request message comprises information regarding a channel through which the channel information is transmitted by the second device and information regarding a timing of transmitting the channel information by the second device; and
    transmitting, to the first device, a response message for the request message comprising the channel information on the timing through the channel,
    wherein the timing is determined based on at least one of an estimated amount of the channel information or an estimated completion time of transmitting the channel information.

9. The method of claim 8, wherein the request message for requesting the channel information comprises identification information of the second device, and resource allocating indication information for the channel information.

10. The method of claim 9, wherein the identification information includes information indicating a group to which the second device belongs, or information indicating a sub-band to which the second device belongs.

11. The method of claim 9, wherein the resource allocating indication information includes information indicating the channel information to be fed back, information indicating a channel through which the channel information is to be transmitted, or at least one of information indicating an order in which the second device feeds back channel information or information indicating a start time when the second device feeds back the channel information.

12. The method of claim 8, wherein the request message for requesting the channel information is duplicated and transmitted to the second device through all available channels.

13. The method of claim 8, wherein the request message for requesting the channel information is transmitted to the second device through a predetermined primary channel or a channel corresponding to the second device.

14. The method of claim 8, wherein the first device comprises an access point, and the second device comprises a station.

15. A first device in a wireless communication system, the first device comprising:
at least one processor configured to determine a timing of transmitting channel information by at least one second device, based on at least one of an estimated amount of the channel information or an estimated completion time of transmitting the channel information; and
a transceiver configured to:
transmit, to at least one second device, a request message for the channel information, wherein the request message comprises information regarding a channel through which the channel information is transmitted by the at least one second device and information regarding the timing; and
receive, from the at least one second device, a response message for the request message comprising the channel information, wherein the response message is transmitted on the timing through the channel by the at least one second device.

16. The device of claim 15, wherein the request message for requesting the channel information comprises identification information of the at least one second device, and resource allocating indication information for the channel information.

17. The device of claim 16, wherein the identification information includes information indicating a group to which the second device belongs, or information indicating a sub-band to which the second device belongs.

18. The device of claim 16, wherein the resource allocating indication information includes information indicating the channel information to be fed back, information indicating a channel through which the channel information is to be transmitted, or at least one of information indicating an order in which each of the at least one second device feeds back channel information or information indicating a start time when each of the at least one second device feeds back the channel information is transmitted.

19. The device of claim 15, wherein the transceiver is further configured to duplicate and transmit the request message for requesting the channel information through all available channels.

20. The device of claim 15, wherein the transceiver is further configured to transmit the request message for requesting the channel information through a predetermined primary channel or a channel corresponding to the second device.

21. The device of claim 15, wherein the first device comprises an access point, and the second device comprises a station.

22. A second device in a wireless communication system, the second device comprising:
a transceiver configured to:
receive, from a first device, a request message for channel information, wherein the request message comprises information regarding a channel through which the channel information is transmitted by the second device and information regarding a timing of transmitting the channel information by the second device; and
transmit, to the first device, a response message for the request message comprising the channel information on the timing through the channel,
wherein the timing is determined based on at least one of an estimated amount of the channel information or an estimated completion time of transmitting the channel information.

23. The device of claim 22, wherein the request message for requesting the channel information comprises identification information of the second device, and resource allocating indication information for the channel information.

24. The device of claim 23, wherein the identification information includes information indicating a group to which the second device belongs, or information indicating a sub-band to which the second device belongs.

25. The device of claim 23, wherein the resource allocating indication information includes information indicating the channel information to be fed back, information indicating a channel through which the channel information is to be transmitted, or at least one of information indicating an order in which the second device feeds back channel information or information indicating a start time when the second device feeds back the channel information is transmitted.

26. The device of claim 22, wherein the request message for requesting the channel information is duplicated and transmitted to the second device through all available channels.

27. The device of claim 22, wherein the request message for requesting the channel information is transmitted to the second device through a predetermined primary channel or a channel corresponding to the second device.

28. The device of claim 22, wherein the first device comprises an access point, and the second device comprises a station.

29. A non-transitory computer readable medium with computer executable instructions stored thereon executed by a processor to perform the method of operating a first device in a wireless communication system, the method comprising:
determining a timing of transmitting channel information by at least one second device, based on at least one of an estimated amount of the channel information or an estimated completion time of transmitting the channel information;
transmitting, to the at least one second device, a request message for the channel information, wherein the request message comprises information regarding a channel through which the channel information is transmitted by the at least one second device and information regarding the timing; and
receiving, from the at least one second device, a response message for the request message comprising the channel information, wherein the channel information is transmitted on the timing through the channel by the at least one second device.

30. A non-transitory computer readable medium with computer executable instructions stored thereon executed by a processor to perform the method of operating a second device in a wireless communication system, the method comprising:
receiving, from a first device, a request message for channel information, wherein the request message comprises information regarding a channel through which the channel information is transmitted by the second device and information regarding a timing of transmitting the channel information by the second device; and transmitting to the first device, a response message for the request message comprising the channel information on the timing through the channel,
wherein the timing is determined based on at least one of an estimated amount of the channel information or an estimated completion time of transmitting the channel information.

* * * * *